(12) United States Patent
Shinohara

(10) Patent No.: US 8,988,587 B2
(45) Date of Patent: Mar. 24, 2015

(54) ZOOM LENS AND IMAGE PICKUP APPARATUS HAVING THE SAME

(71) Applicant: Canon Kabushiki Kaisha, Tokyo (JP)

(72) Inventor: Kenji Shinohara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 13/942,371

(22) Filed: Jul. 15, 2013

(65) Prior Publication Data

US 2014/0022416 A1 Jan. 23, 2014

(30) Foreign Application Priority Data

Jul. 17, 2012 (JP) .................................. 2012-158513

(51) Int. Cl.
*G03B 13/00* (2006.01)
*G02B 15/14* (2006.01)
*G03B 17/00* (2006.01)
*H04N 5/232* (2006.01)
*G02B 15/177* (2006.01)

(52) U.S. Cl.
CPC ............ *G02B 15/14* (2013.01); *H04N 5/23296* (2013.01); *G02B 15/177* (2013.01)
USPC .............................. 348/345; 359/696; 396/79

(58) Field of Classification Search
USPC .................. 348/345–356, 240.2; 396/79–83, 396/89–152; 359/696, 698; 382/255
See application file for complete search history.

(56) References Cited

U.S. PATENT DOCUMENTS

| | | | | |
|---|---|---|---|---|
| 8,169,533 | B2 * | 5/2012 | Sakamoto | 348/345 |
| 2003/0011895 | A1 * | 1/2003 | Mori | 359/749 |
| 2011/0194016 | A1 * | 8/2011 | Noda | 348/345 |
| 2011/0285896 | A1 * | 11/2011 | Mihara | 348/345 |
| 2012/0038816 | A1 * | 2/2012 | Yamano | 348/345 |

FOREIGN PATENT DOCUMENTS

| JP | 2009205055 A | 9/2009 |
|---|---|---|
| JP | 2009230122 A | 10/2009 |

* cited by examiner

*Primary Examiner* — Mekonnen Dagnew
(74) *Attorney, Agent, or Firm* — Canon USA Inc. IP Division

(57) ABSTRACT

A zoom lens includes, in order from an object side to an image side, a first lens unit having negative refractive power, a second lens unit having positive refractive power, a third lens unit having negative refractive power, and a fourth lens unit having positive refractive power. During zooming, a distance between every adjacent lens unit from the first to fourth lens units varies. A focal length fw of the entire zoom lens at a wide-angle end, a focal length f1 of the first lens unit, and a focal length f4 of the fourth lens unit are appropriately set according to predetermined mathematical conditions.

10 Claims, 29 Drawing Sheets

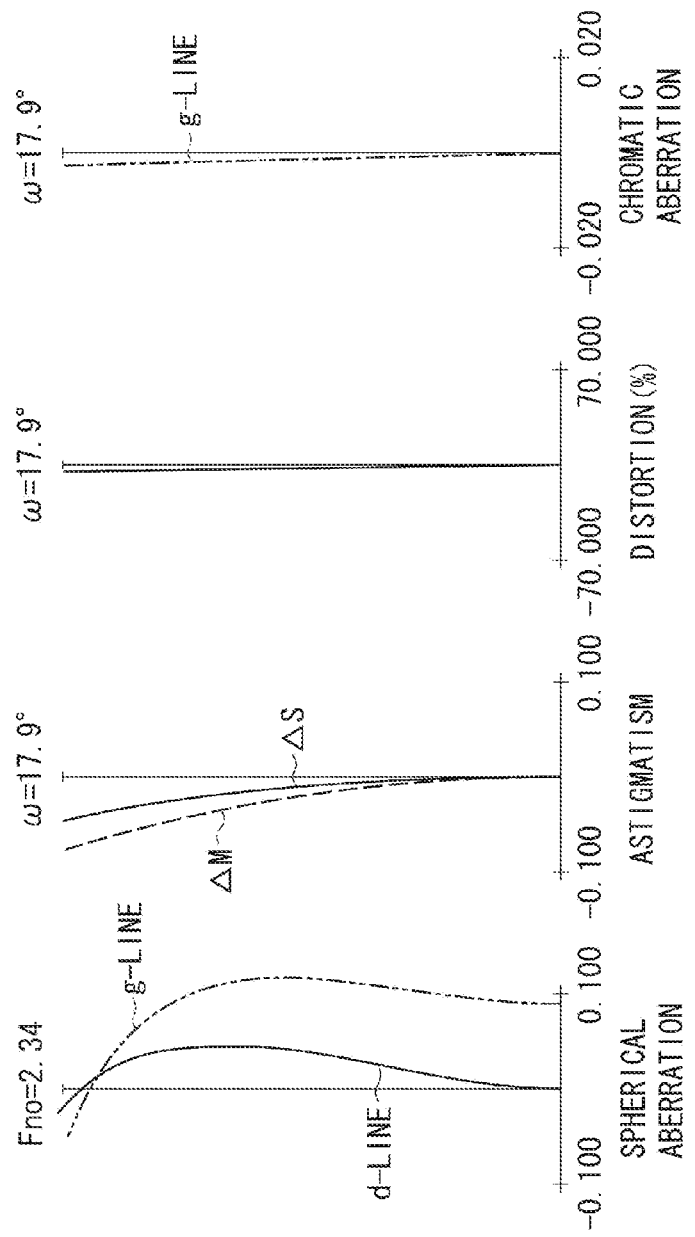

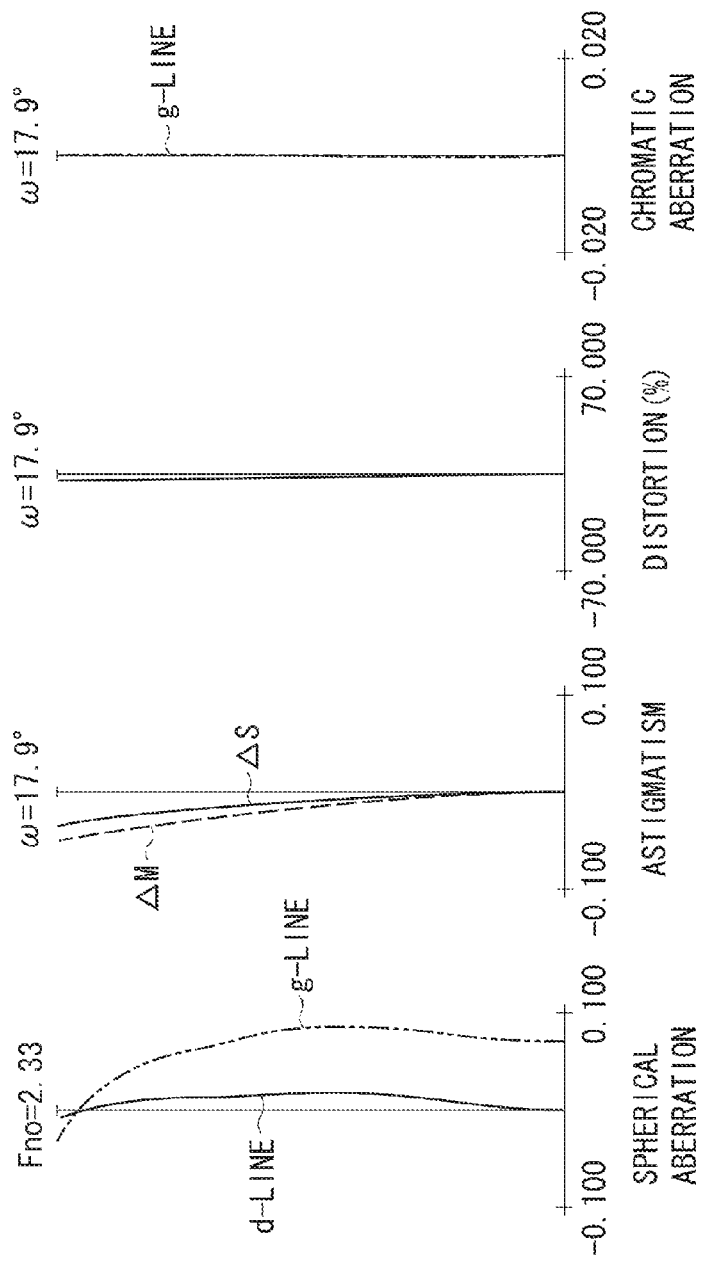

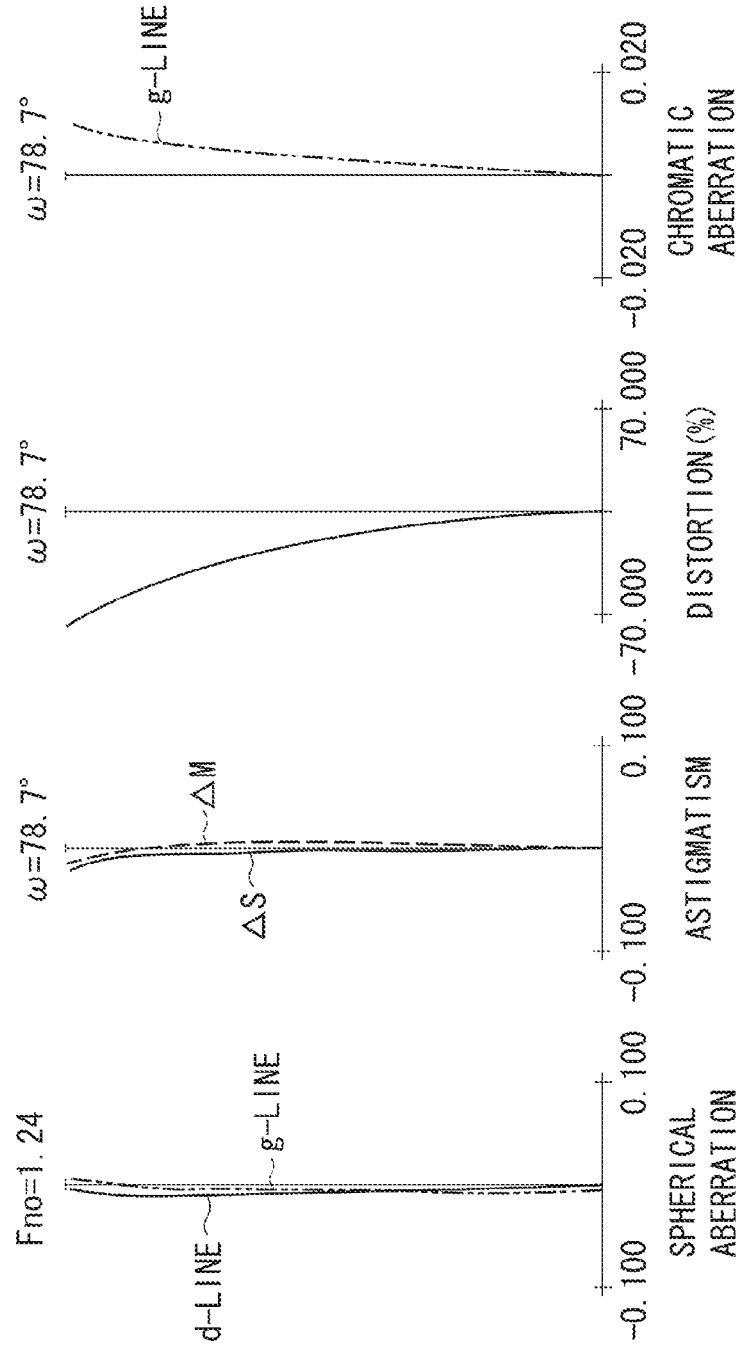

ZOOM LENS AND IMAGE PICKUP APPARATUS HAVING THE SAME

BACKGROUND OF THE INVENTION

1. Field of the Invention

The present invention relates to a zoom lens and an image pickup apparatus, such as a video camera, a monitoring camera, a digital still camera, and a broadcasting camera, having the zoom lens.

2. Description of the Related Art

In recent years, a monitoring camera with high functionality and small size has been required. To that end, it is desirable that a photographic optical system to be used in the monitoring camera has higher functionality and smaller size than conventional photographical optical systems.

Examples of functions desired from a photographic optical system include, but are not limited to, having a large-diameter to provide a bright optical system, being able to capture an image even in low illumination environments, having a wide angle of view and a high zoom ratio, and being able to zoom on an object along the entire zoom range.

Japanese Patent Application Laid-Open No. 2009-205055 discusses a two-unit zoom lens including a first lens unit having negative refractive power and a second lens unit having positive refractive power in order from an object side to an image side. Japanese Patent Application Laid-Open No. 2009-230122 discusses a three-unit zoom lens including a first lens unit having negative refractive power, a second lens unit having positive refractive power, and a third lens unit having negative refractive power in order from an object side to an image side.

In a negative-lead type of zoom lens in which a lens unit arranged closest to an object side has negative refractive power, it is relatively easy to reduce the diameter of a front lens. Therefore, the configuration of the negative-lead type of zoom lens is advantageous to realizing a small-sized zoom lens with a wide angle of view.

The zoom lenses discussed in Japanese Patent Application Laid-Open No. 2009-205055 and Japanese Patent Application Laid-Open No. 2009-230122 have an F-number at a wide-angle end of about 2.85, a photographing angle of view at the wide-angle end of about 130 degrees, and a zooming ratio of about 2.1. However, these zoom lenses do not fully satisfy the demand to cause the monitoring camera to be more functional.

SUMMARY OF THE INVENTION

The present invention is directed to a zoom lens with a wide angle of view and a small size, which has high optical performance in the entire zoom area, and an image pickup apparatus including the zoom lens.

According to an aspect of the present invention, a zoom lens includes, in order from an object side to an image side, a first lens unit having negative refractive power, a second lens unit having positive refractive power, a third lens unit having negative refractive power, and a fourth lens unit having positive refractive power. During zooming, a distance between every adjacent lens unit from the first to fourth lens units varies. When a focal length of the entire zoom lens at a wide-angle end is denoted by fw, a focal length of the first lens unit is denoted by f1, and a focal length of the fourth lens unit is denoted by f4, the following conditions are satisfied:

$12.4 < f4/fw < 200.0$ $2.9 < |f1|/fw < 6.0$.

Further features of the present invention will become apparent from the following description of exemplary embodiments with reference to the attached drawings.

BRIEF DESCRIPTION OF THE DRAWINGS

FIGS. 2A, 2B, and 2C are aberration diagrams at the wide-angle end, a middle zoom position, and a telephoto end, respectively, of the zoom lens according to the first exemplary embodiment.

FIGS. 4A, 4B, and 4C are aberration diagrams at the wide-angle end, a middle zoom position, and a telephoto end, respectively, of the zoom lens according to the second exemplary embodiment.

FIGS. 10A, 10B, and 10C are aberration diagrams at the wide-angle end, a middle zoom position, and a telephoto end, respectively, of the zoom lens according to the fifth exemplary embodiment.

DESCRIPTION OF THE EMBODIMENTS

Hereinafter, a zoom lens according to the exemplary embodiments of the present invention and an image pickup apparatus including the zoom lens will be described. The zoom lens according to the exemplary embodiments of the present invention includes a first lens unit having negative refractive power, a second lens unit having positive refractive power, a third lens unit having negative refractive power, and a fourth lens unit having positive refractive power in order from an object side to an image side. During zooming from a wide-angle end to a telephoto end, each of the first to third lens units moves, but the fourth lens unit may or may not move.

Specifically, when zooming is performed, the first lens unit moves toward the image side and the second and third lens units move toward the object side. The fourth lens unit moves toward the object side or does not move depending on desired result as further explained below. Regardless, however, during zooming, a distance between every adjacent lens unit from the first to fourth lens units varies.

Figure 1:
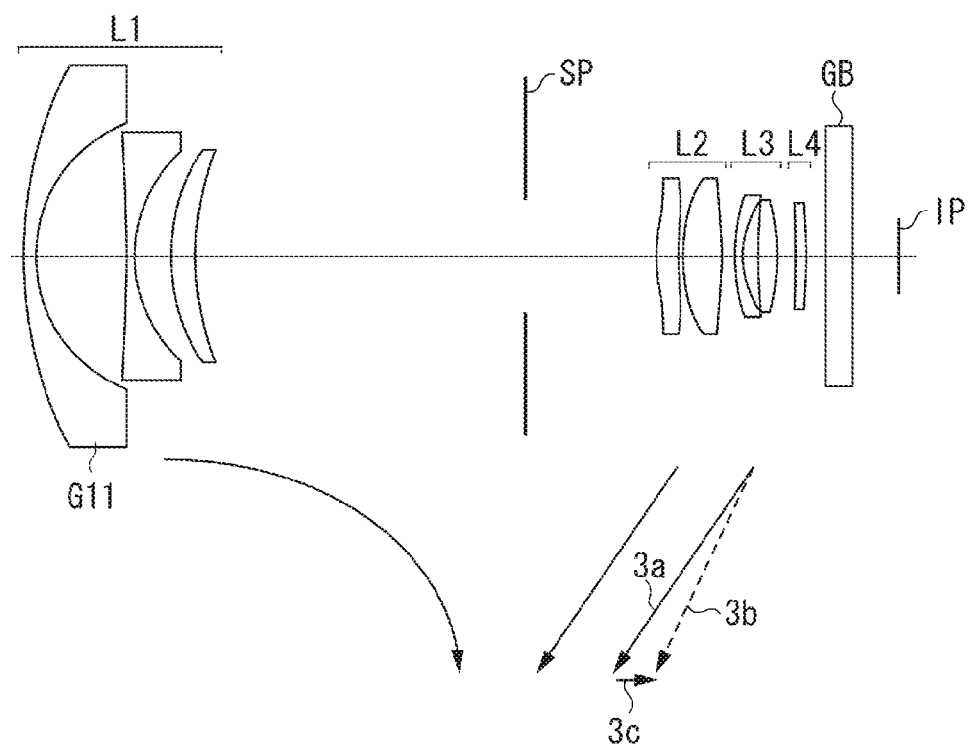
FIG. 1 is a lens cross-sectional view at a wide-angle end of a zoom lens according to a first exemplary embodiment.
Figure 2A:
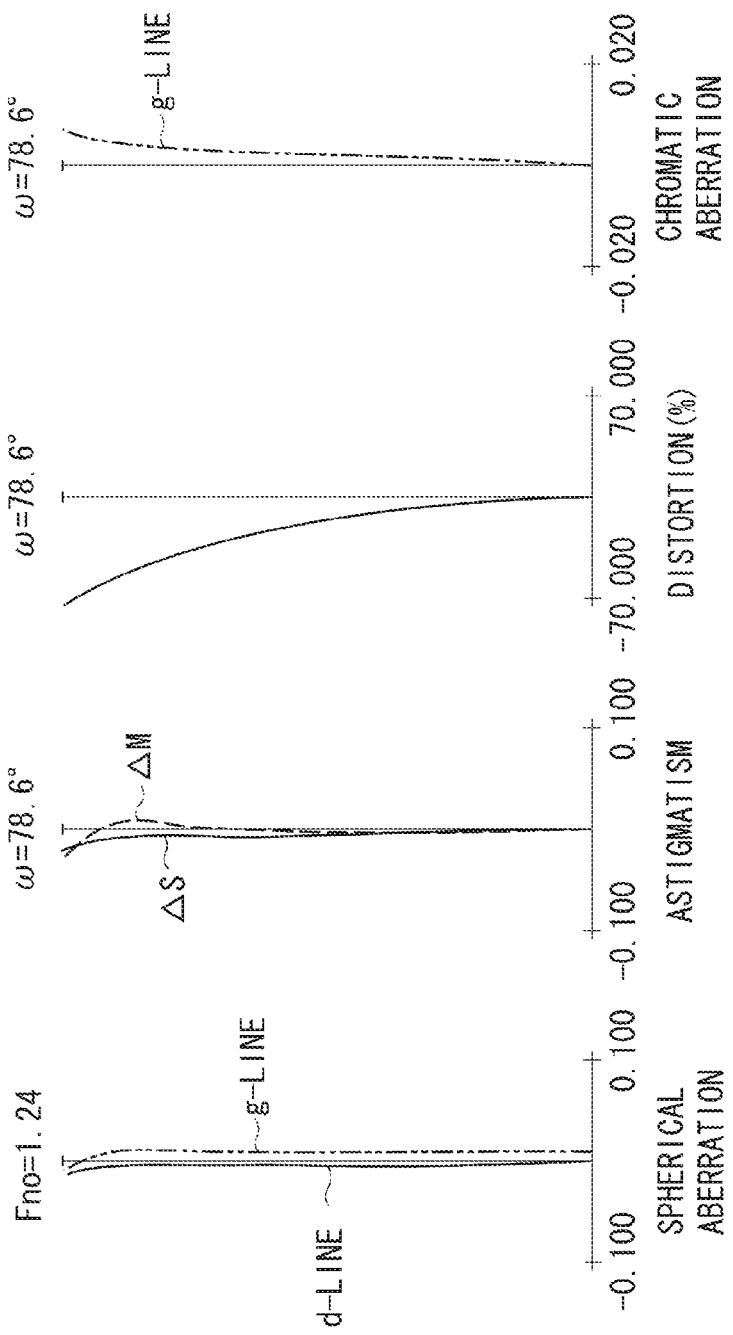
Figure 2B:
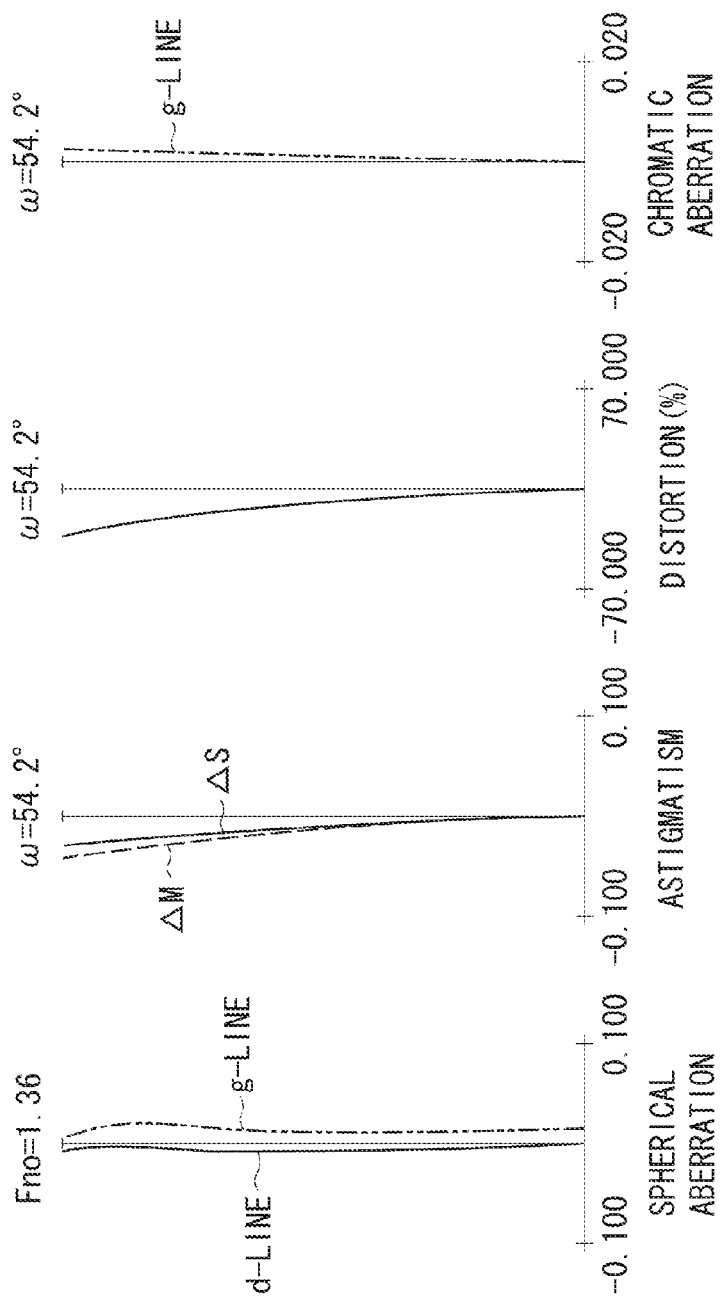
Figure 3:
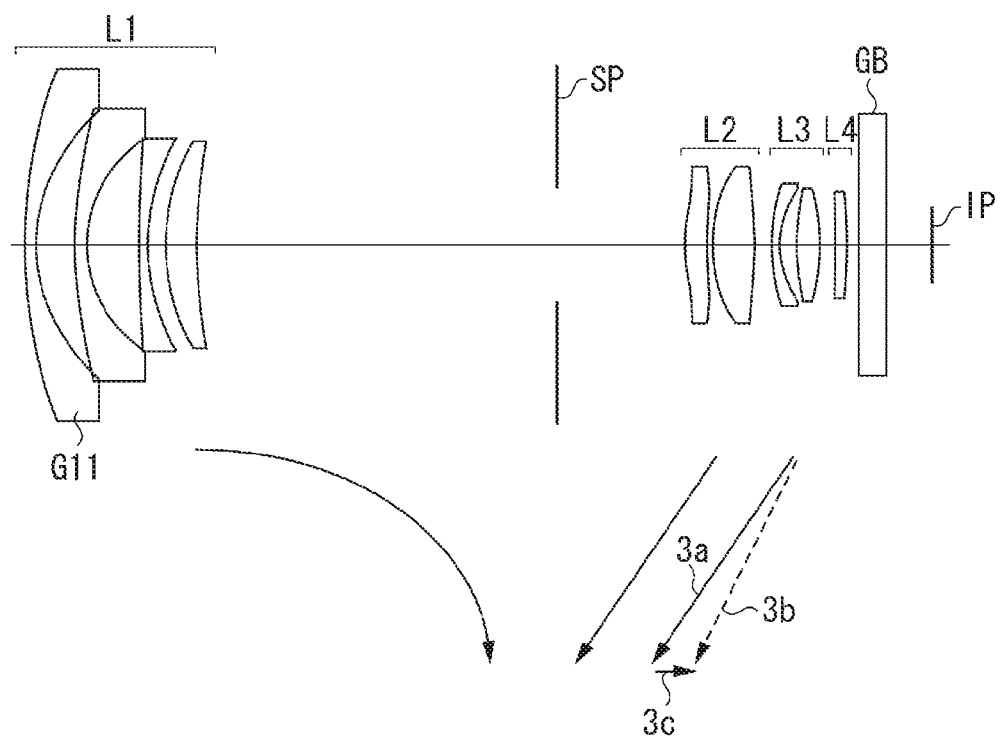
FIG. 3 is a lens cross-sectional view at a wide-angle end of a zoom lens according to a second exemplary embodiment.
Figure 4A:
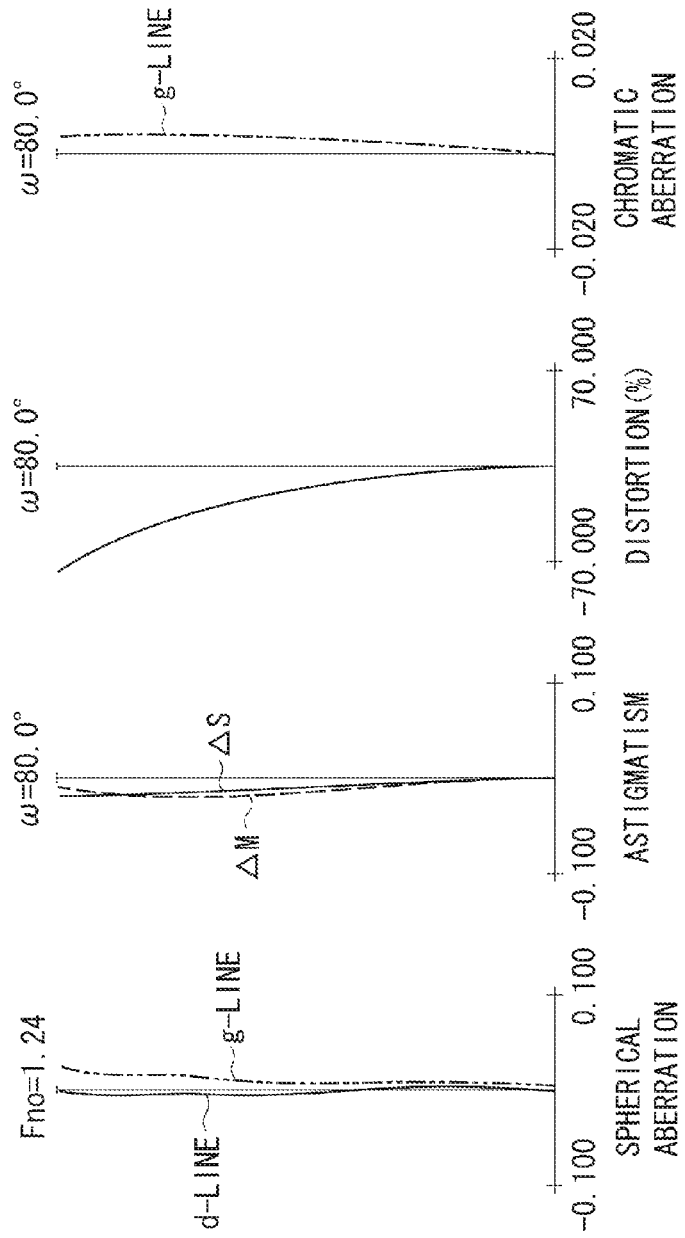
Figure 4B:
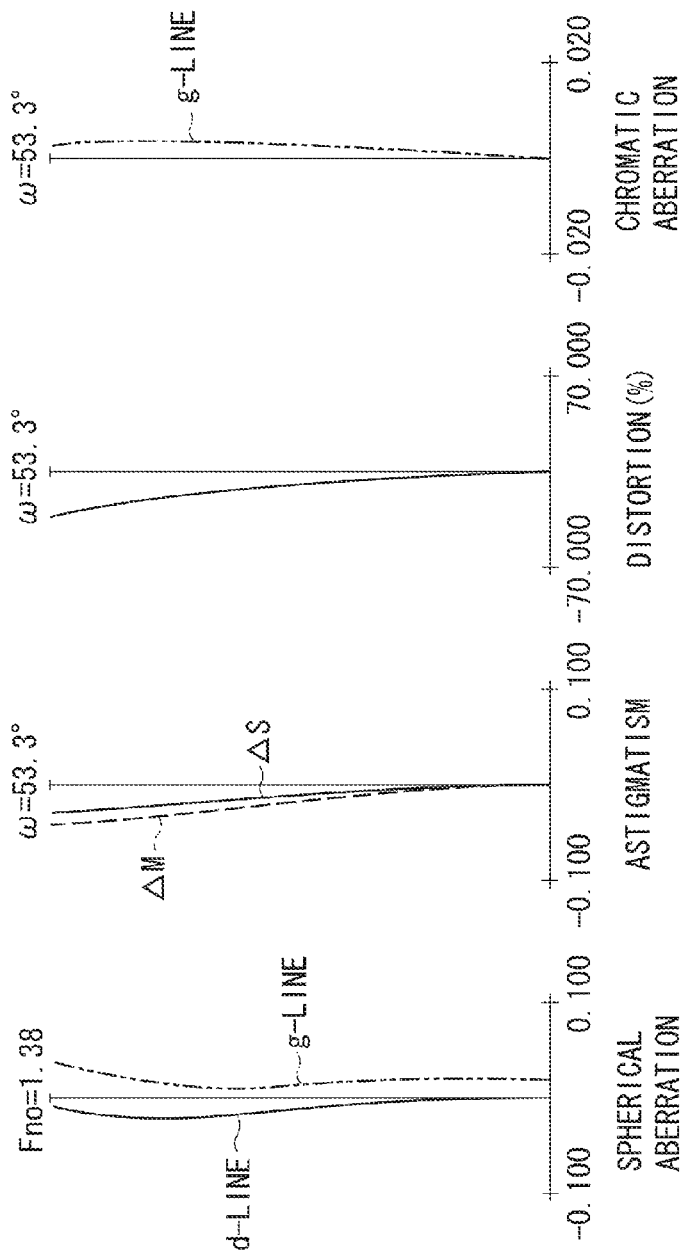

FIG. 1 is a lens cross-sectional view at the wide-angle end of the zoom lens according to a first exemplary embodiment. FIGS. 2A, 2B, and 2C are aberration diagrams at the wide-angle end, a middle zoom position, and a telephoto end, respectively, of the zoom lens according to the first exemplary embodiment. The first exemplary embodiment is a zoom lens with a zoom ratio of about 3.97 and an aperture ratio of about 1.24 to 2.34. FIG. 3 is a lens cross-sectional view at the wide-angle end of the zoom lens according to a second exemplary embodiment. FIGS. 4A, 4B, and 4C are aberration diagrams at the wide-angle end, a middle zoom position, and a telephoto end, respectively, of the zoom lens according to the second exemplary embodiment. The second exemplary embodiment is a zoom lens with a zoom ratio of about 3.98 and an aperture ratio of about 1.24 to 2.33.

Figure 5:
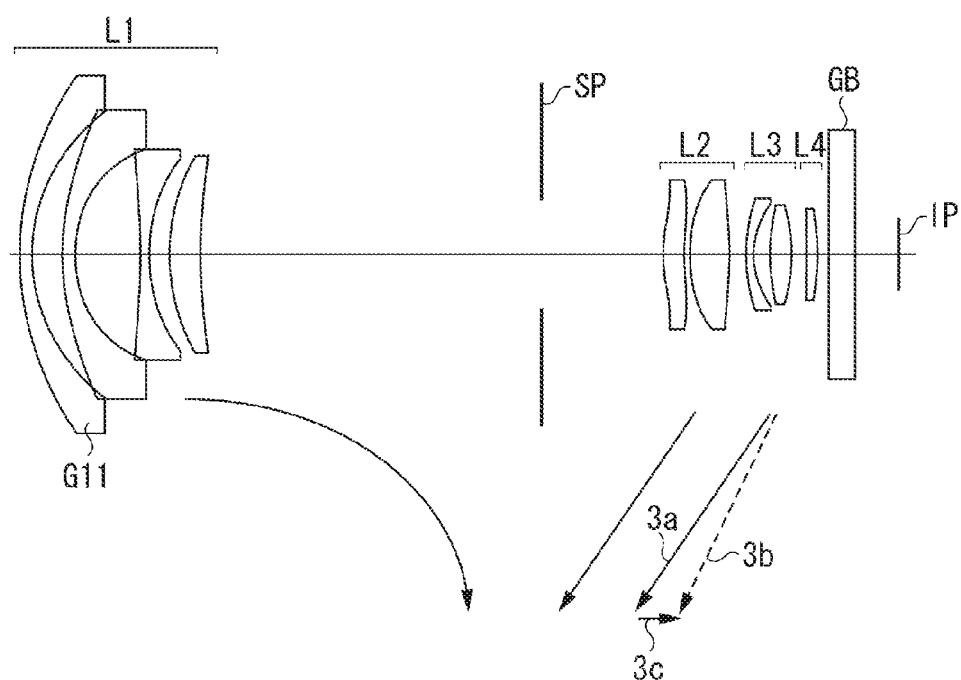
FIG. 5 is a lens cross-sectional view at a wide-angle end of a zoom lens according to a third exemplary embodiment.
Figure 6A:
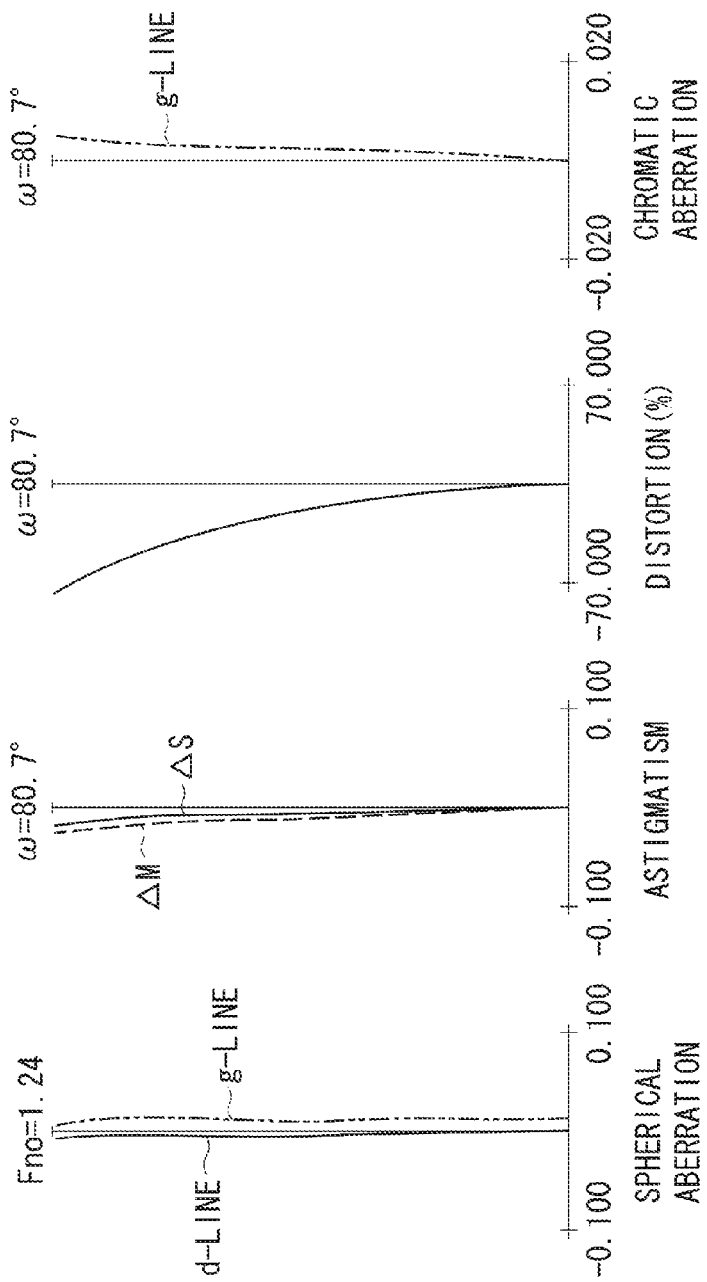
FIGS. 6A, 6B, and 6C are aberration diagrams at the wide-angle end, a middle zoom position, and a telephoto end, respectively, of the zoom lens according to the third exemplary embodiment.
Figure 6B:
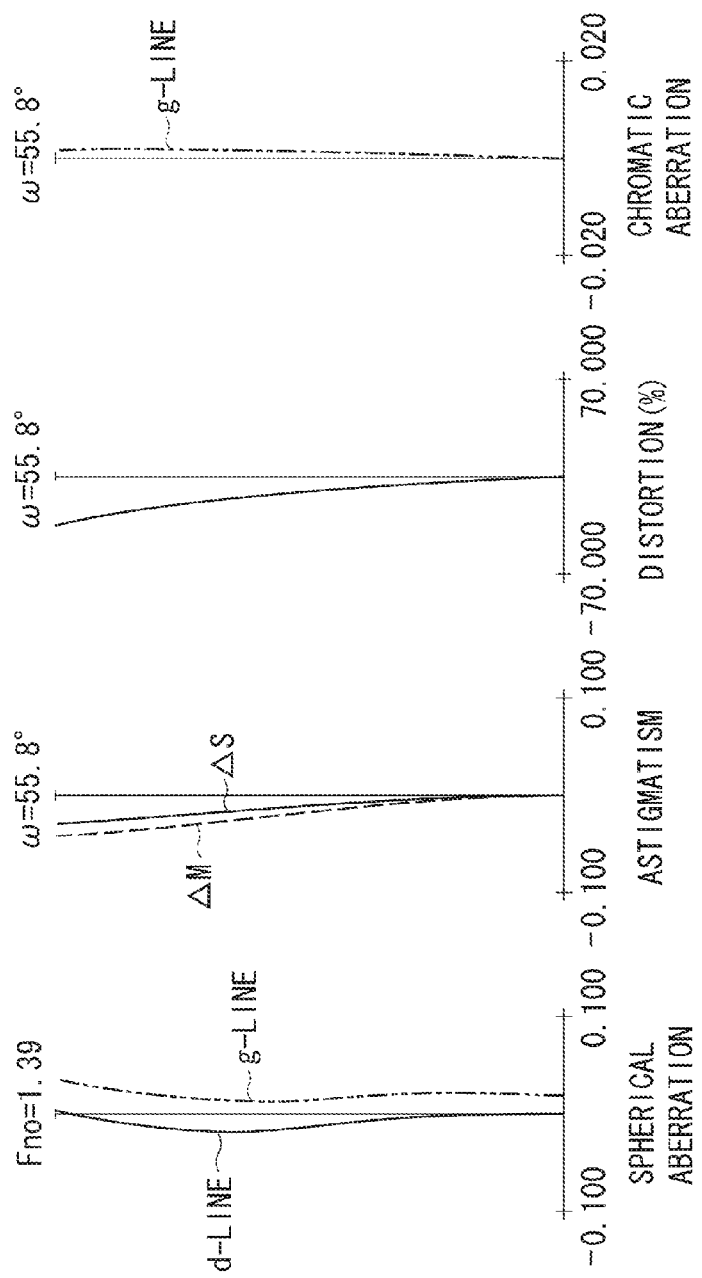
Figure 6C:
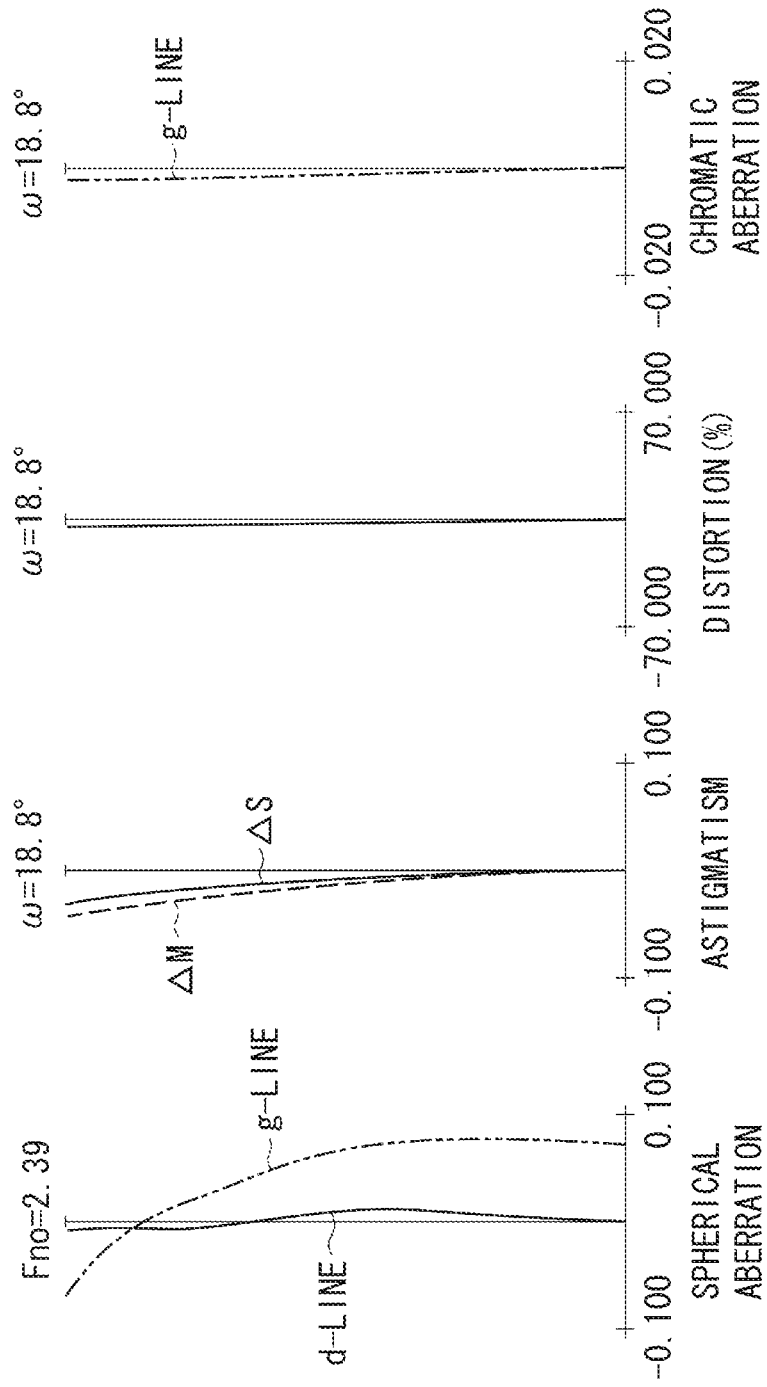
Figure 7:
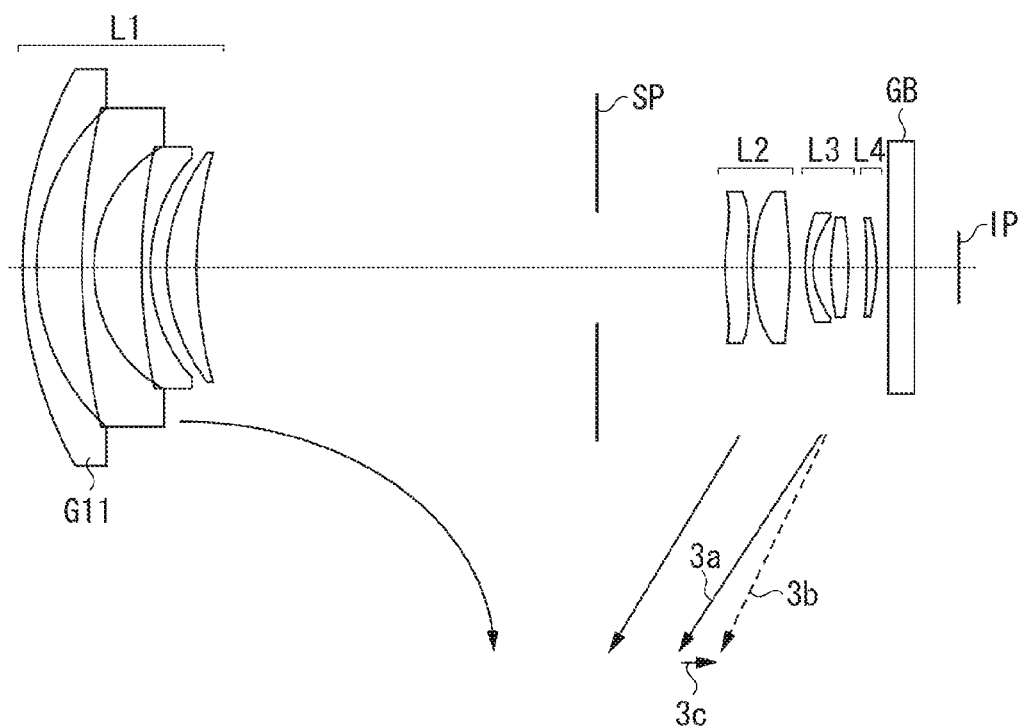
FIG. 7 is a lens cross-sectional view at a wide-angle end of a zoom lens according to a fourth exemplary embodiment.
Figure 8A:
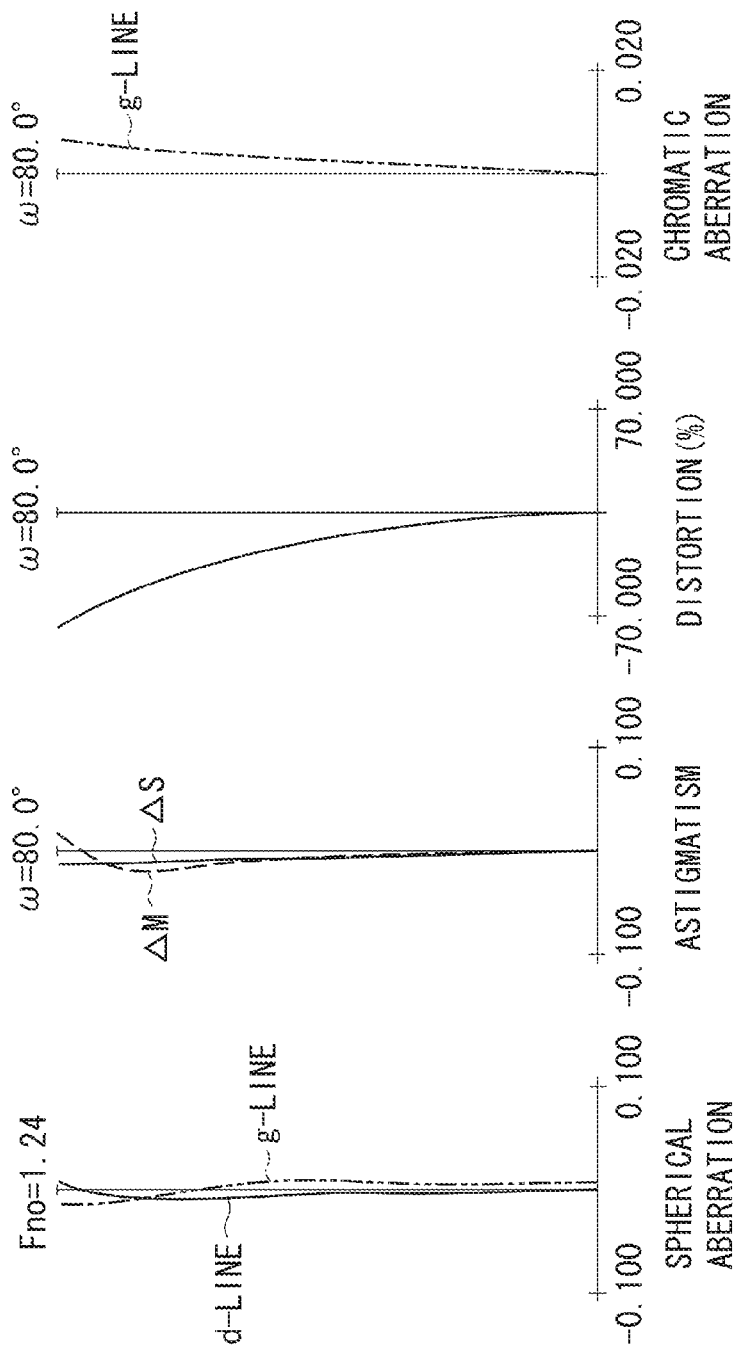
FIGS. 8A, 8B, and 8C are aberration diagrams at the wide-angle end, a middle zoom position, and a telephoto end, respectively, of the zoom lens according to the fourth exemplary embodiment.
Figure 8B:
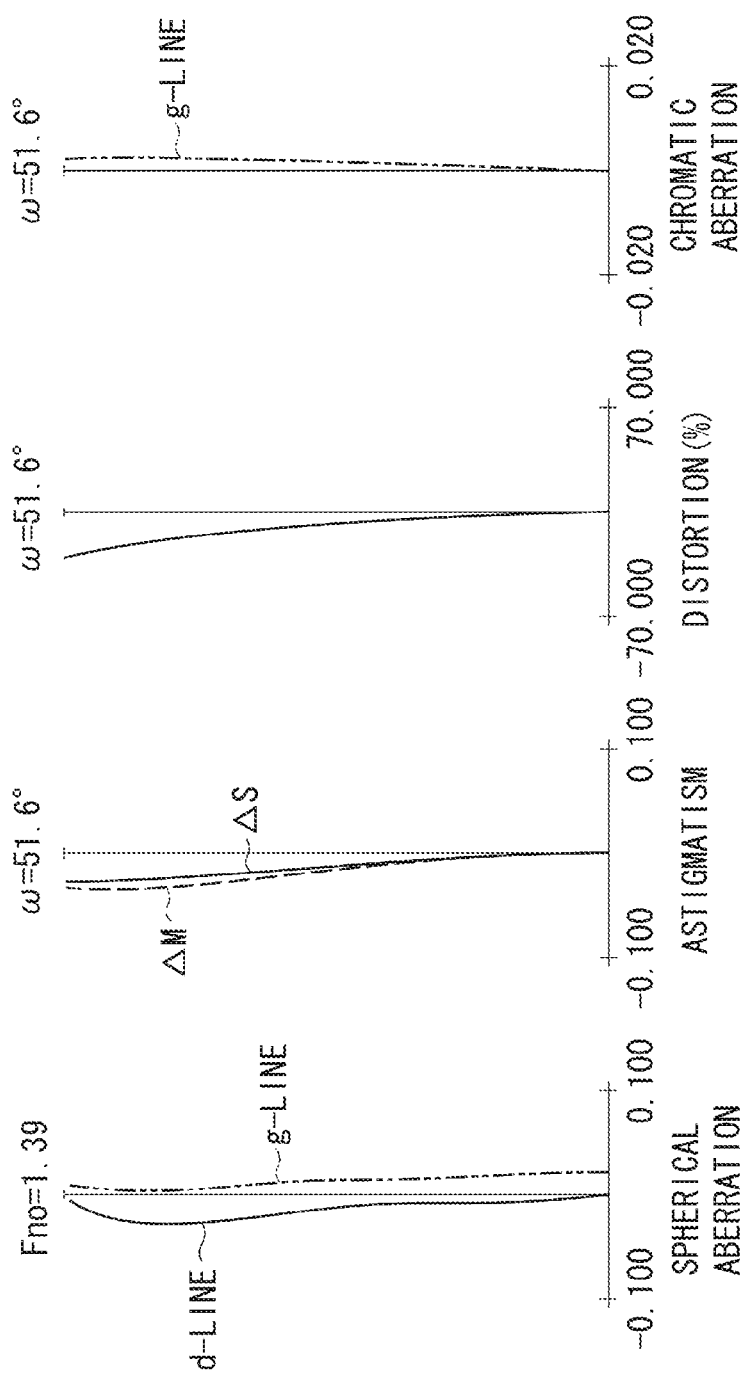
Figure 8C:
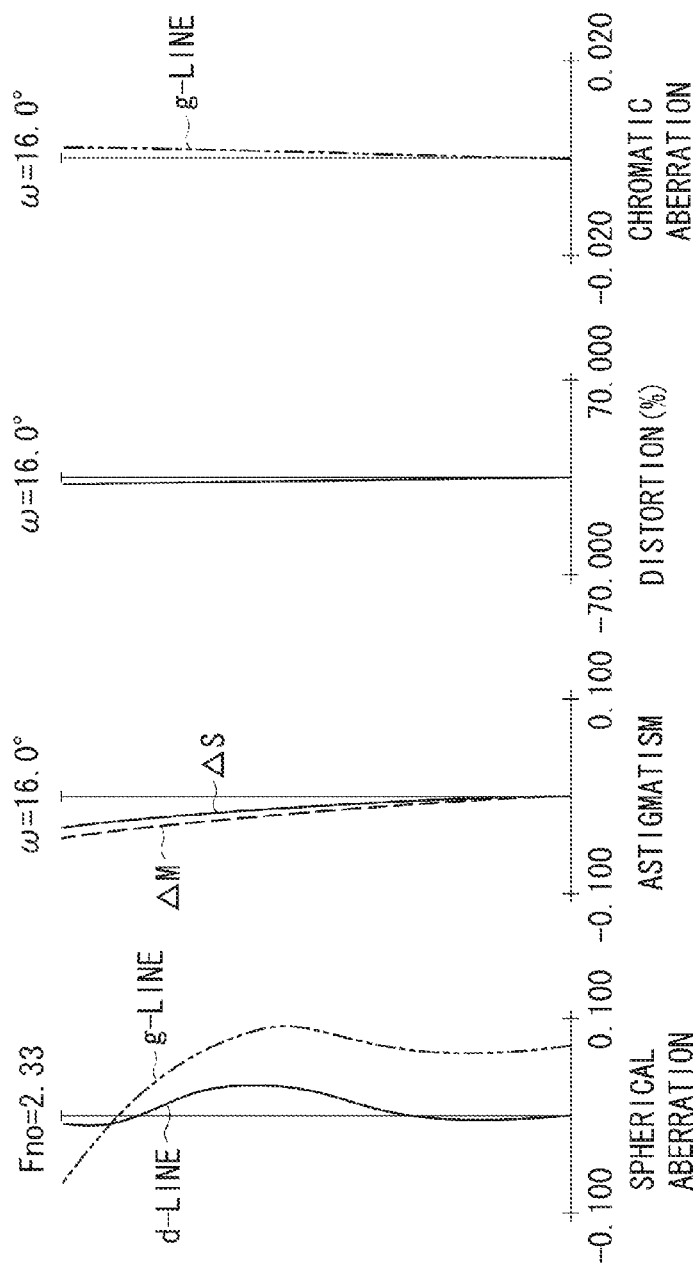

FIG. 5 is a lens cross-sectional view at the wide-angle end of the zoom lens according to a third exemplary embodiment. FIGS. 6A, 6B, and 6C are aberration diagrams at the wide-angle end, a middle zoom position, and a telephoto end, respectively, of the zoom lens according to the third exemplary embodiment. The third exemplary embodiment is a zoom lens with a zoom ratio of about 4.06 and an aperture ratio of about 1.24 to 2.39. FIG. 7 is a lens cross-sectional view at the wide-angle end of the zoom lens according to a fourth exemplary embodiment. FIGS. 8A, 8B, and 8C are aberration diagrams at the wide-angle end, a middle zoom position, and a telephoto end, respectively, of the zoom lens according to the fourth exemplary embodiment. The fourth exemplary embodiment is a zoom lens with a zoom ratio of about 4.42 and an aperture ratio of about 1.24 to 2.33.

Figure 9:
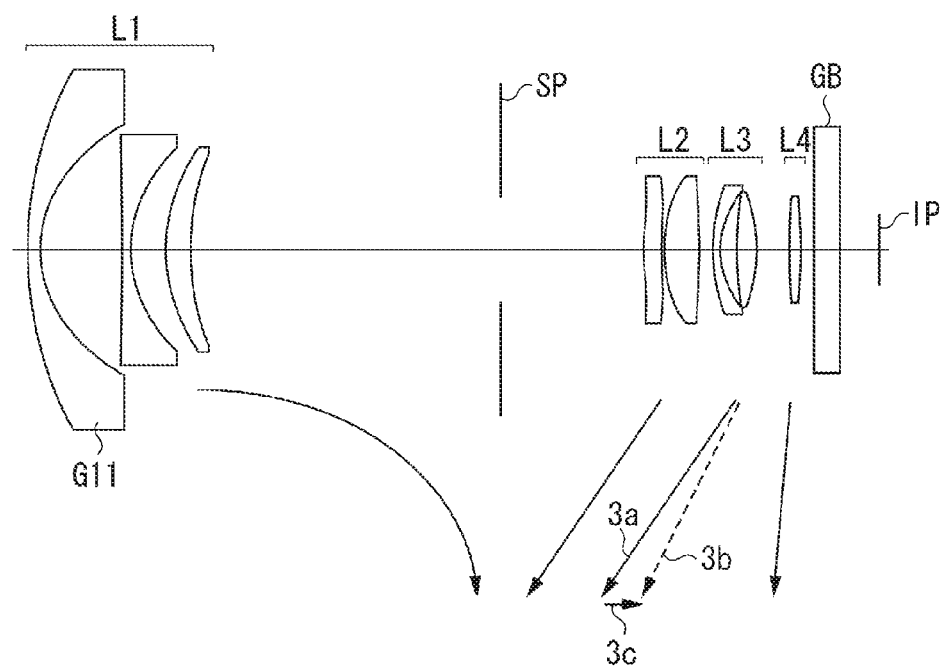
FIG. 9 is a lens cross-sectional view at a wide-angle end of a zoom lens according to a fifth exemplary embodiment.
Figure 10B:
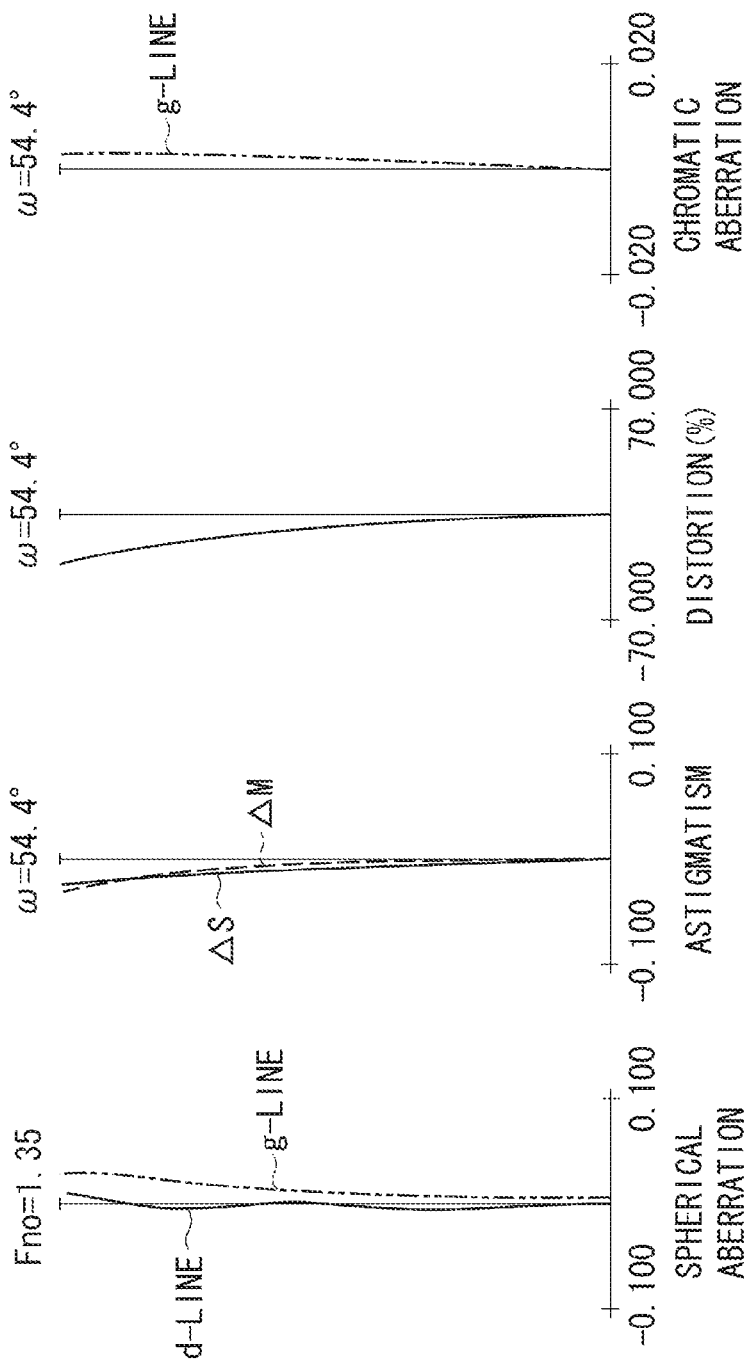
Figure 10C:
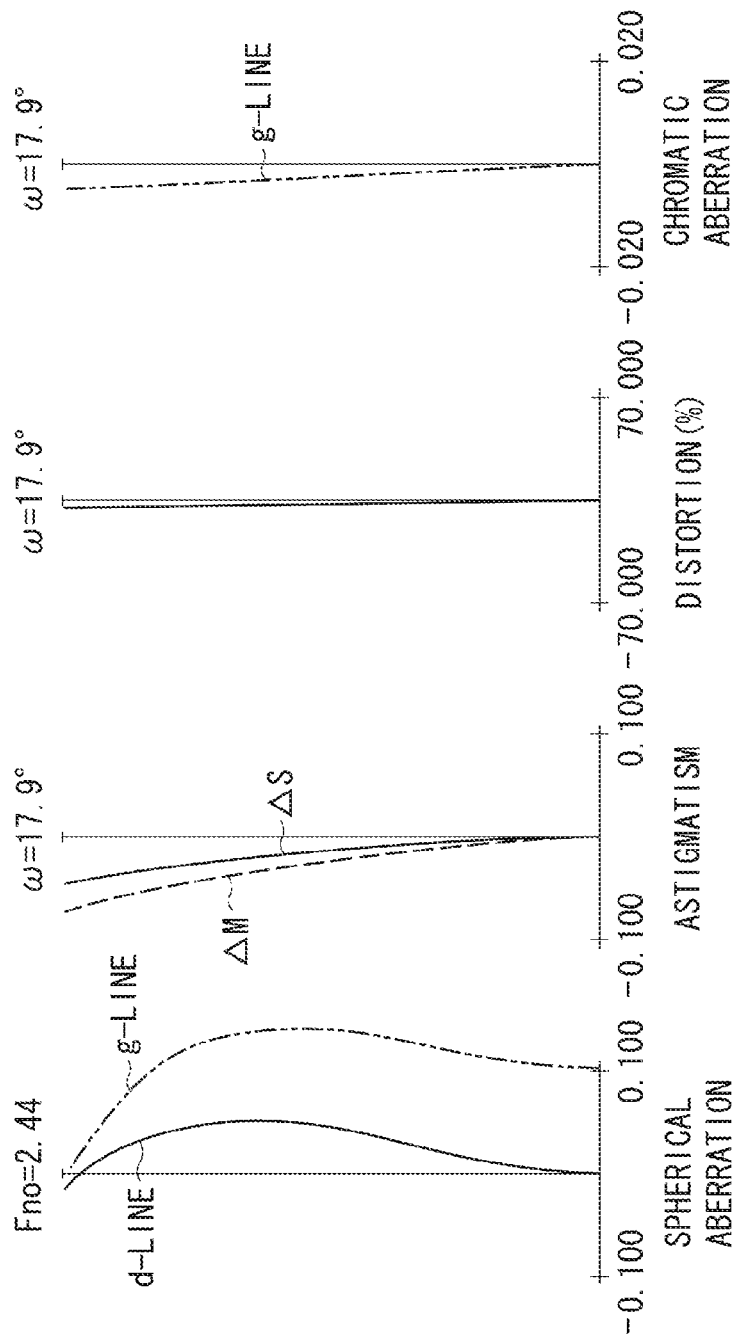
Figure 11:
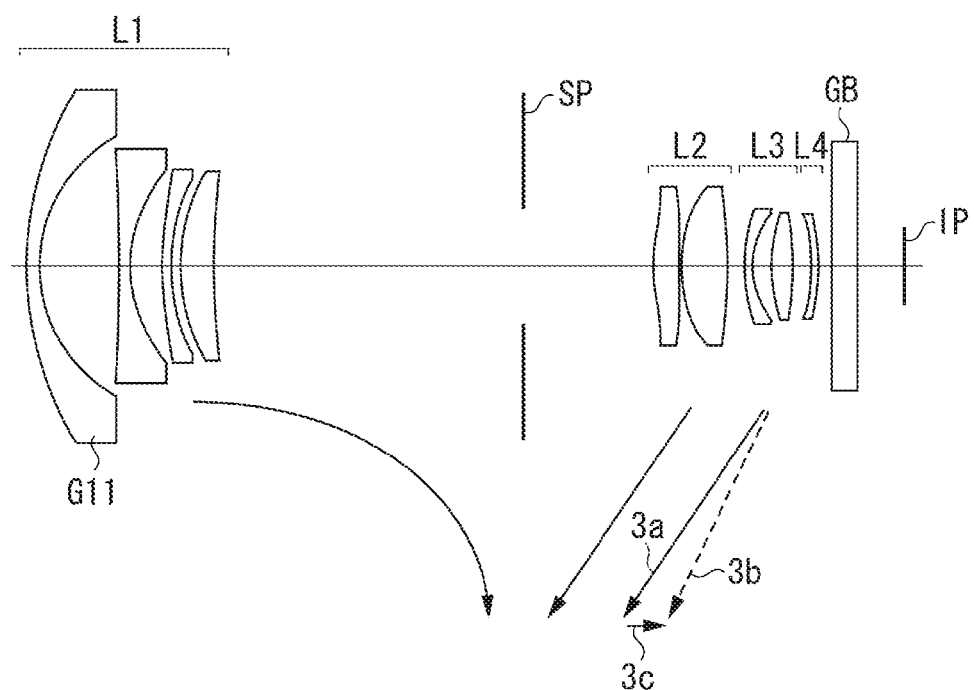
FIG. 11 is a lens cross-sectional view at a wide-angle end of a zoom lens according to a sixth exemplary embodiment.
Figure 12A:
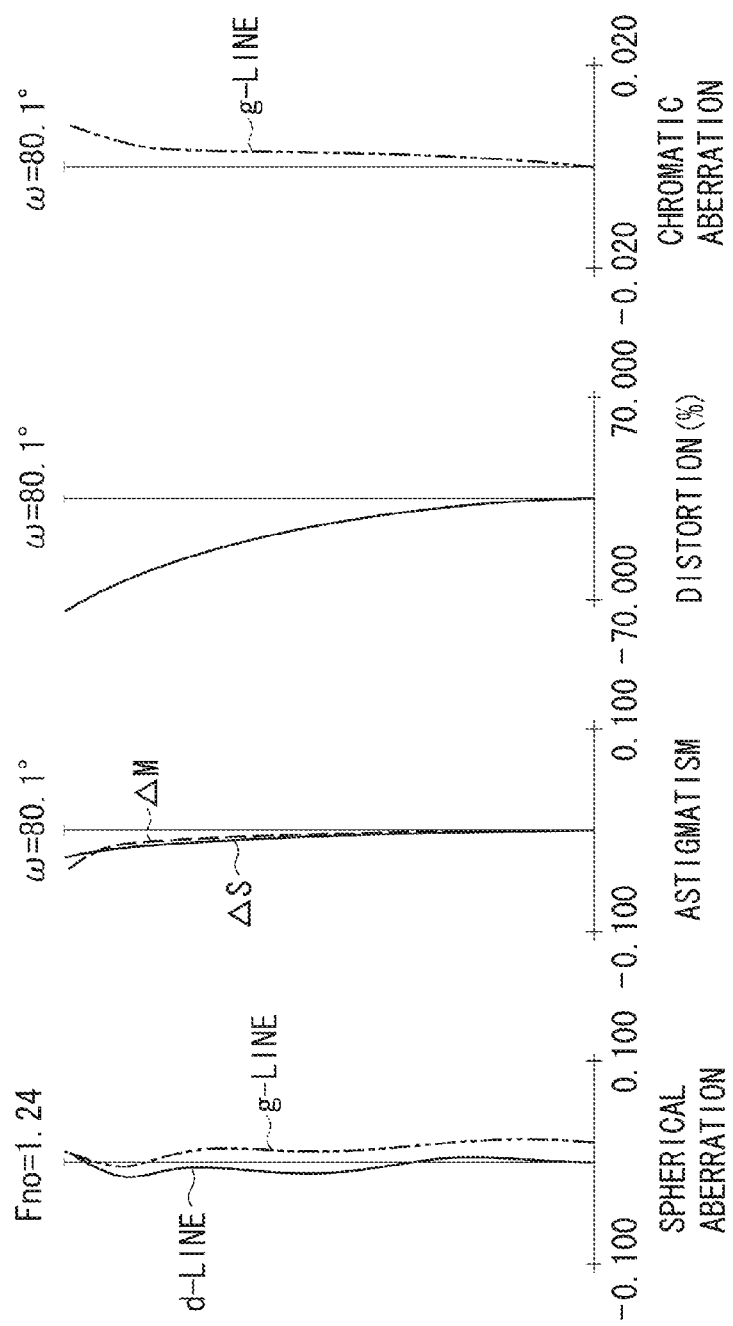
FIGS. 12A, 12B, and 12C are aberration diagrams at the wide-angle end, a middle zoom position, and a telephoto end, respectively, of the zoom lens according to the sixth exemplary embodiment.
Figure 12B:
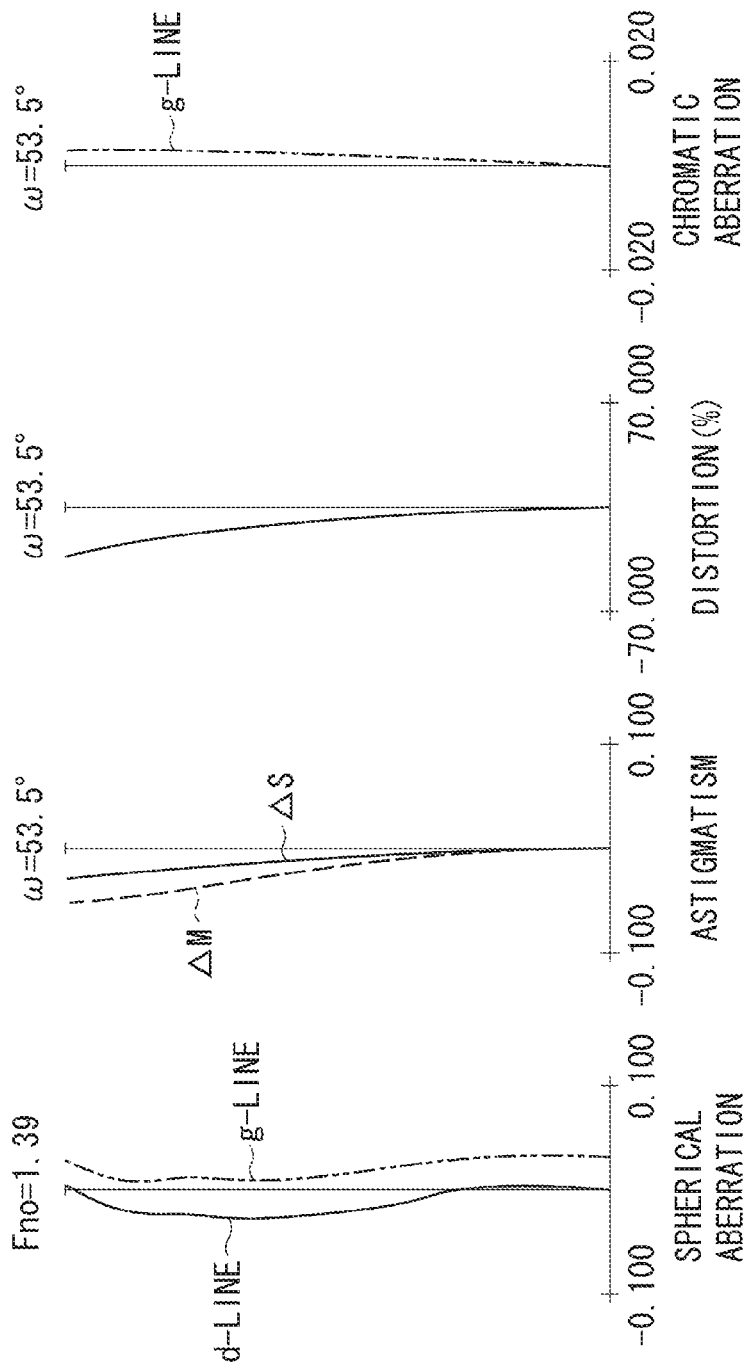
Figure 12C:
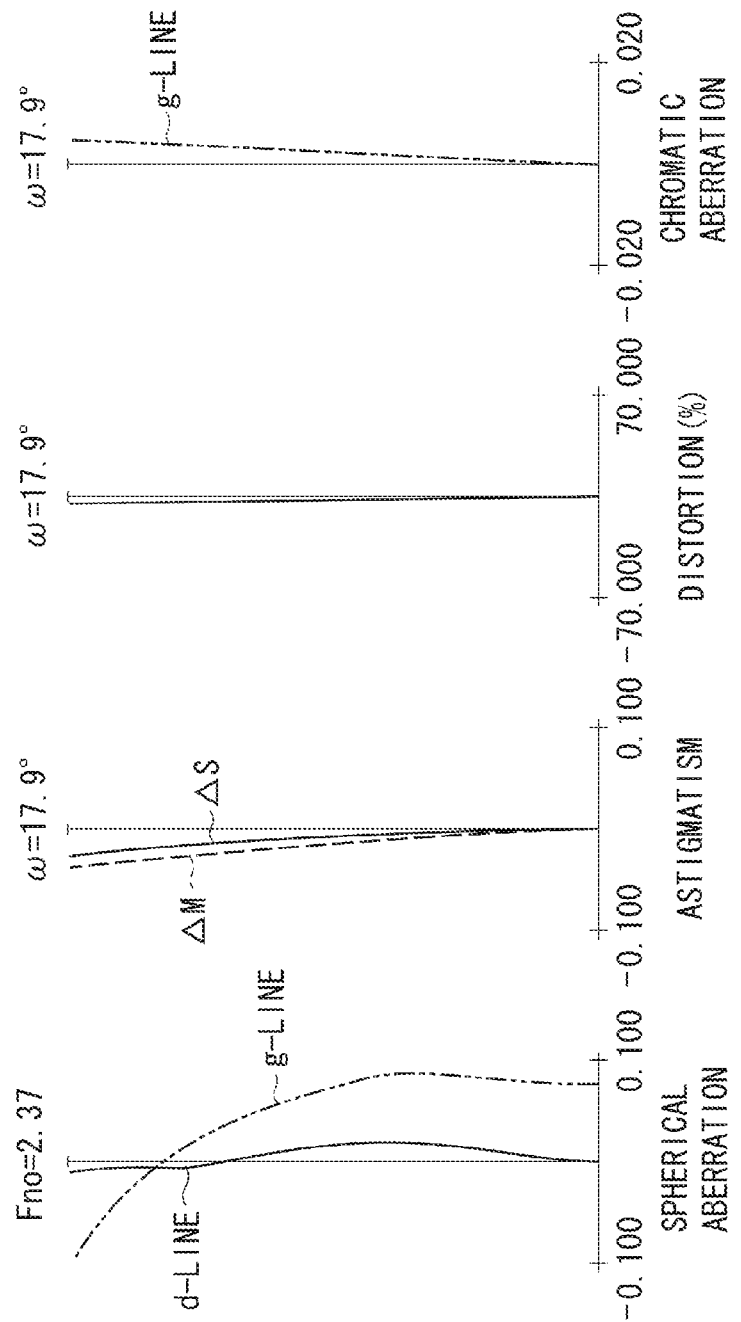

FIG. 9 is a lens cross-sectional view at the wide-angle end of the zoom lens according to a fifth exemplary embodiment. FIGS. 10A, 10B, and 10C are aberration diagrams at the wide-angle end, a middle zoom position, and a telephoto end, respectively, of the zoom lens according to the fifth exemplary embodiment. The fifth exemplary embodiment is a zoom lens with a zoom ratio of about 3.98 and an aperture ratio of about 1.24 to 2.44. FIG. 11 is a lens cross-sectional view at the wide-angle end of the zoom lens according to a sixth exemplary embodiment. FIGS. 12A, 12B, and 12C are aberration diagrams at the wide-angle end, a middle zoom position, and a telephoto end, respectively, of the zoom lens according to the sixth exemplary embodiment. The sixth exemplary embodiment is a zoom lens with a zoom ratio of about 4.00 and an aperture ratio of about 1.24 to 2.37.

Figure 13:
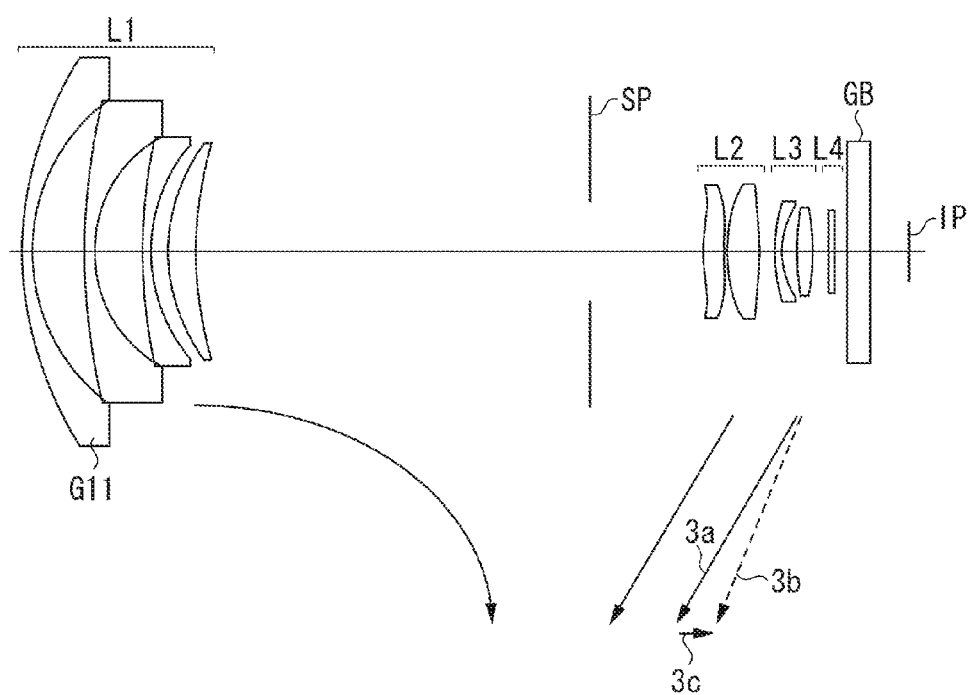
FIG. 13 is a lens cross-sectional view at a wide-angle end of a zoom lens according to a seventh exemplary embodiment.
Figure 14A:
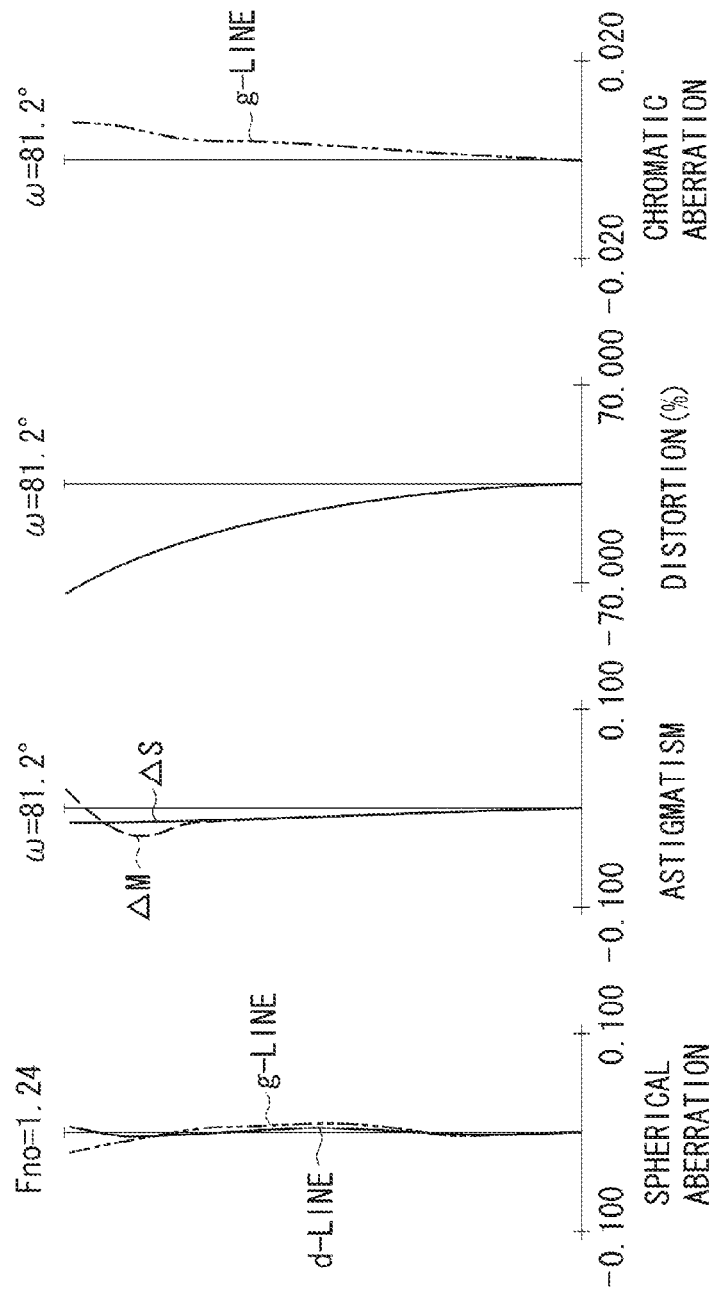
FIGS. 14A, 14B, and 14C are aberration diagrams at the wide-angle end, a middle zoom position, and a telephoto end, respectively, of the zoom lens according to the seventh exemplary embodiment.
Figure 14B:
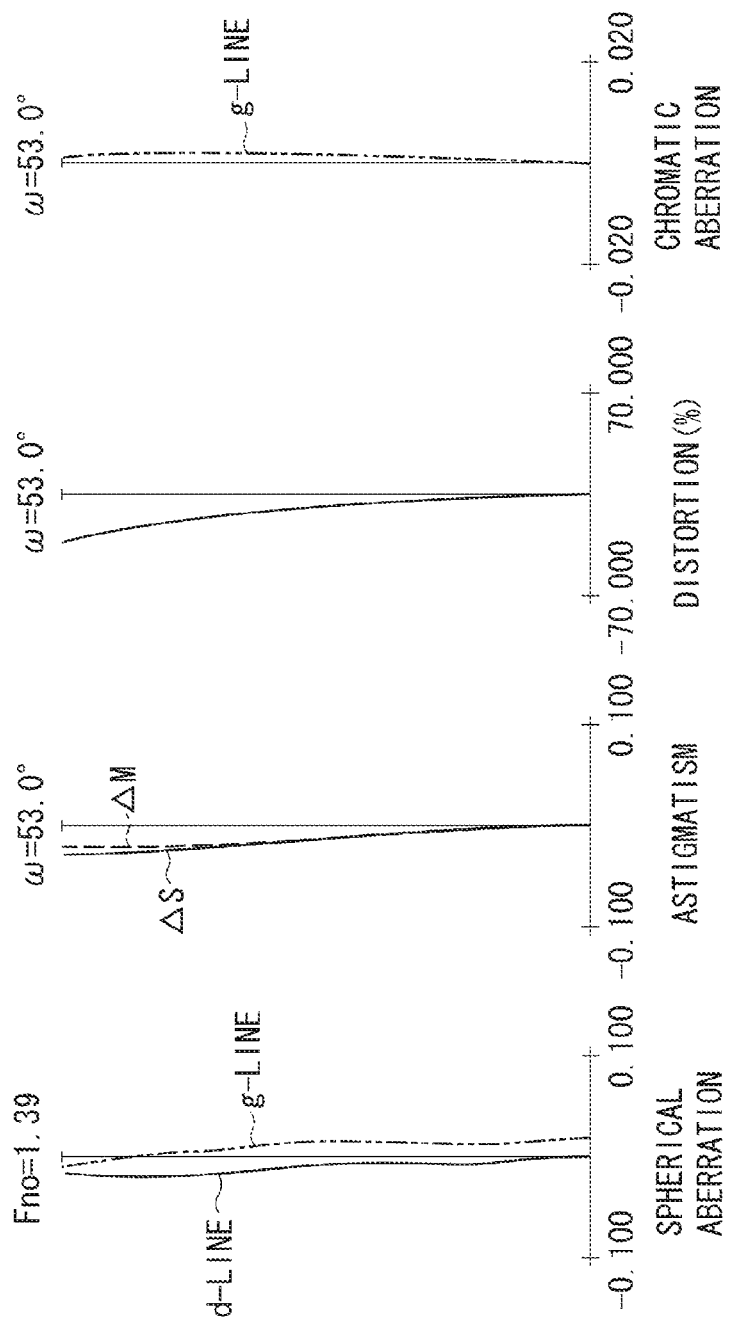
Figure 14C:
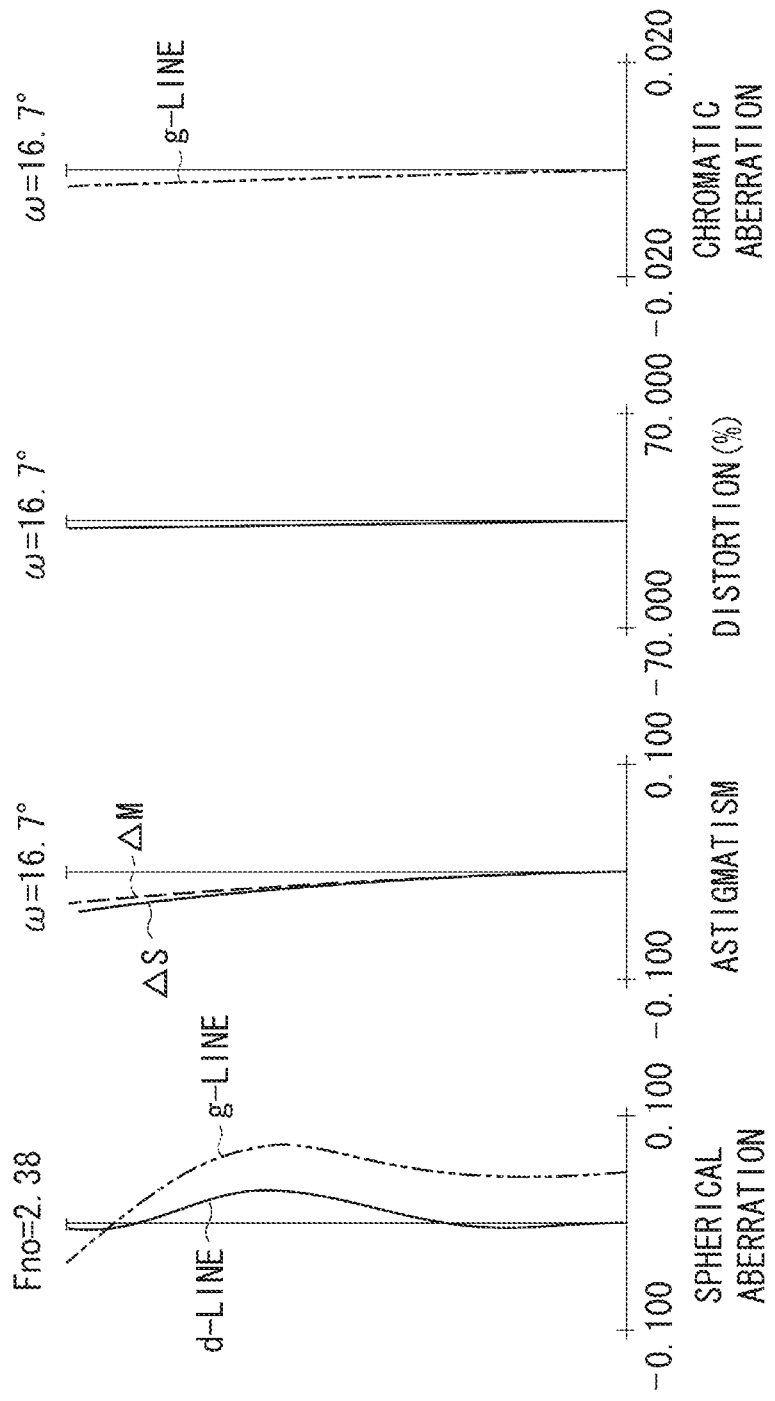

FIG. 13 is a lens cross-sectional view at the wide-angle end of the zoom lens according to a seventh exemplary embodiment. FIGS. 14A, 14B, and 14C are aberration diagrams at the wide-angle end, a middle zoom position, and a telephoto end, respectively, of the zoom lens according to the seventh exemplary embodiment. The seventh embodiment is a zoom lens with a zoom ratio of about 4.49 and an aperture ratio of about 1.24 to 2.38.

Figure 15:
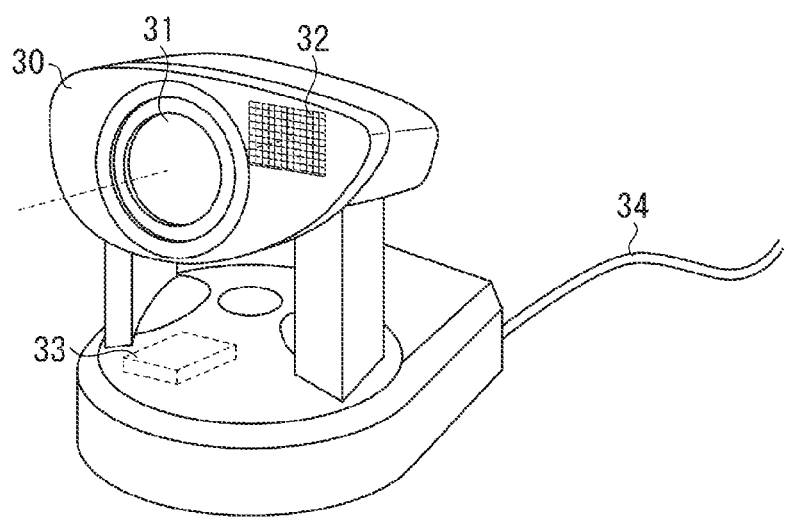
FIG. 15 is a schematic diagram of an essential portion of an image pickup apparatus including a zoom lens according to the exemplary embodiments of the present invention.

FIG. 15 is a schematic diagram of a monitoring camera (image pickup apparatus) including a zoom lens according to the exemplary embodiments of the present invention. The zoom lens according to each exemplary embodiment is a photographic optical system used in an image pickup apparatus such as a video camera, a digital still camera, a silver-halide film camera, and a television camera. Therefore, as used herein, a monitoring camera is an example of an image pickup apparatus. In the lens cross-sectional views of the various drawings, the left side is the object side and the right side is the image side. Also, in the lens cross-sectional views, the index i is defined as a sequential number of elements in order from the object side to the image side. Therefore, Li represents the i-th lens unit counted from the object side.

The zoom lens according to each exemplary embodiment includes a first lens unit L1 having negative refractive power, a second lens unit L2 having positive refractive power, a third lens unit L3 having negative refractive power, and a fourth lens unit L4 having positive refractive power in order from the object side to the image side. The zoom lens of each exemplary embodiment is a negative lead type four-unit zoom lens including four lens units.

In the lens cross-sectional view of each exemplary embodiment, an aperture stop SP is located between the first lens unit L1 and the second lens unit L2. The aperture stop SP remains stationary (does not move along the optical axis) during zooming and during focusing. Since the aperture stop SP does not move, it is not necessary to provide a drive apparatus such as an actuator, which is used to move the aperture stop SP. It is thus possible to downsize a lens barrel structure. However, if desired, it is possible to employ a configuration in which the aperture stop SP moves during zooming.

An optical block GB corresponds to an optical filter, a faceplate, a low-pass filter, an infrared cut filter, or the like. An image plane IP is also illustrated. When the zoom lens is used as a photographic optical system in a video camera or a digital camera, the image plane IP corresponds to a solid-state image sensor (photoelectric conversion element) such as a charge-coupled device (CCD) sensor and a complementary metal-oxide semiconductor (CMOS) sensor. When the zoom lens is used as a photographic optical system in a silver-halide film camera, the image plane IP corresponds to a film surface. Arrows in the lens cross-sectional views each indicate a moving locus of each lens unit during zooming. In each exemplary embodiment, when the first lens unit L1 moves toward the image side, image plane variation due to zooming is corrected.

In spherical aberration diagrams, Fno is an F-number. A solid line represents the d line (wavelength is 587.6 nm) and a dashed line represents the g line (wavelength is 435.8 nm). In astigmatism diagrams, a solid line represents a sagittal image plane at the d line and a dashed line represents a meridional image plane at the d line. Distortion aberration is indicated at the d line. Lateral chromatic aberration diagrams illustrate aberration at the g line with respect to the d line. Here, ω is a half angle of view. In the exemplary embodiments below, the wide-angle end and the telephoto end are zoom positions, respectively, when a zooming lens unit is located at both ends of a range in which the zooming lens unit can move on an optical axis under a mechanical restriction.

In each exemplary embodiment, when an off-axis ray passes through the fourth lens unit L4, the off-axis ray passes through a position away from the optical axis. At a position away from the optical axis, coma and curvature of field are easily generated. Therefore, the fourth lens unit L4 having positive refractive power is arranged closest to the image side to improve telecentricity, so that it is possible to effectively prevent coma and curvature of field from being generated. Further, an appropriate refractive power is given to the first lens unit L1, so that it is possible to obtain a zoom lens with a wide angle of view and a small size while properly correcting various aberrations.

Regarding focusing, an inner focus method is employed in which focusing is performed by moving the third lens unit L3 on the optical axis. During focusing from an infinitely distant object to a near-distant object at the telephoto end, as indicated by an arrow 3c in the lens cross-sectional views, the third lens unit L3 moves toward the image side.

A curve 3a in the lens cross-sectional views indicates a moving locus for correcting the image plane variation due to zooming during focusing on an infinitely distant object. A curve 3b indicates a moving locus for correcting the image plane variation due to zooming during focusing on a near-distant object. During focusing from an infinitely distant object to a near-distant object at the telephoto end, the third lens unit L3 is moved toward the image side, so that a space between the third lens unit L3 and the fourth lens unit L4 is effectively used.

Although the first lens unit L1 does not move for focusing, the first lens unit L1 may move to correct aberration. The fourth lens unit L4 may or may not move during zooming and during focusing.

If the fourth lens unit L4 is configured not to move during zooming, it is possible to downsize a drive mechanism for moving the lens units, so that downsizing of the lens barrel structure is achieved. On the other hand, if the fourth lens unit L4 moves toward the image side during zooming, a zooming load is applied to the fourth lens unit L4, so that the degree of freedom of design of the lens units other than the fourth lens unit L4 is increased.

Here, when the focal length of the entire zoom lens at the wide-angle end is denoted by fw, the focal length of the first lens unit L1 is denoted by f1, and the focal length of the fourth lens unit L4 is denoted by f4, each exemplary embodiment satisfies both of the following conditions:

$$12.4 < f4/fw < 200.0 \quad (1)$$

$$2.8 < |f1|/fw < 6.0 \quad (2)$$

Condition (1) defines a ratio between the focal length f4 of the fourth lens unit L4 and the focal length fw of the entire zoom lens at the wide-angle end. When the refractive power of the fourth lens unit L4 weakens, the upper limit of the condition (1) is surpassed (becomes larger); this makes it difficult to properly correct curvature of field and coma aberration. When the refractive power of the fourth lens unit L4 increases, the lower limit of the condition (1) is surpassed (becomes smaller); this makes it difficult to correct spherical aberration on the wide-angle side and also makes it difficult to suppress variation of lateral chromatic aberration (chromatic aberration of magnification) due to zooming.

Condition (2) defines a ratio between an absolute value |f1| of the focal length f1 of the first lens unit L1 and the focal length fw of the entire zoom lens at the wide-angle end. When the absolute value |f1| of the focal length f1 of the first lens unit L1 increases, the upper limit of the condition (2) is surpassed (becomes larger); this makes it difficult to achieve a sufficiently wide angle of view. In order to realize a high zoom ratio, the amount of movement of the first lens unit L1 increases during zooming. As a result, the total length of the lens increases, which is not desirable. When the absolute value |f1| of the focal length f1 of the first lens unit L1 decreases, the lower limit of the condition (2) is surpassed (becomes smaller); this makes it difficult to correct spherical aberration at the telephoto end and makes it difficult to correct curvature of field and the at a middle zoom position.

In each exemplary embodiment, as described above, each element is appropriately set to satisfy both the conditions (1) and (2) at the same time. It is thus possible to obtain a zoom lens with a wide angle of view and a small size, which has good optical performance in the entire zoom range. In each exemplary embodiment, ranges of numerical values in the conditions (1) and (2), while staying within the above-defined limits, may be permitted certain variations, as follows:

$$15.0 < f4/fw < 150.0 \quad (1a)$$

$$3.0 < |f1|/fw < 5.5 \quad (2a)$$

In addition, while still remaining within the limits of conditions (1) and (2), these may be more desirably set to ranges of numerical values as follows:

$$20.0 < f4/fw < 100.0 \quad (1b)$$

$$3.2 \leq |f1|/fw < 5.0 \quad (2b).$$

Also, in each exemplary embodiment, one or more conditions described below can be satisfied. Here, a focal length of a lens G11 located closest to the object side in the first lens unit L1 is defined as fG11; and the amount of movement of the third lens unit L3 during zooming from the wide-angle end to the telephoto end is defined as M3. The amount of movement may be defined as a difference in position on the optical axis of each lens unit between the wide-angle end and the telephoto end. The sign of the amount of movement is positive when the lens unit is moved to be located on the object side at the telephoto end compared with the wide-angle end. Further, a lateral magnification of the second lens unit L2 at the wide-angle end is defined as β2w; the focal length of the third lens unit L3 is defined as f3; and an average value of refractive indices of all negative lenses included in the first lens unit L1 is defined as N1d. Given the foregoing definitions, it is advantageous that one or more of the mathematical conditions set forth below be satisfied simultaneously with mathematical conditions (1) and (2).

$$2.0 < |fG11|/|f1| < 5.2 \quad (3)$$

$$0.01 < M3/|f3| < 0.20 \quad (4)$$

$$-0.30 < \beta 2w < -0.14 \quad (5)$$

$$20.0 < |f3|/fw < 50.0 \quad (6)$$

$$1.800 < N1d \quad (7).$$

The condition (3) defines a ratio between the focal length fG11 of the lens G11 located closest to the object side in the first lens unit L1 and the focal length f1 of the first lens unit L1. When the refractive power of the lens G11 weakens beyond the upper limit of the condition (3), the zooming load of the other lenses included in the first lens unit L1 increases. As a result, it is difficult to prevent curvature of field and distortion from occurring at the wide-angle end, so that it is not desirable. When the refractive power of the lens G11 increases beyond the lower limit of the condition (3), it is difficult to correct spherical aberration at the telephoto end, so that it is not desirable. Further, the curvature of a surface of the lens G11 on the image side increases, so that a thickness deviation ratio (a ratio between a central thickness and a peripheral thickness) increases. As a result, manufacturing becomes difficult, which is not desirable.

The condition (4) defines a ratio between the amount of movement M3 of the third lens unit L3 and the focal length f3 of the third lens unit L3. When the amount of movement M3 of the third lens unit L3 increases beyond the upper limit of the condition (4), the total length of the lens increases, which is not desirable. When the amount of movement M3 of the third lens unit L3 decreases beyond the lower limit of the condition (4), it is advantageous to reducing the total length of the lens. However, it is difficult to suppress variation of spherical aberration and coma due to zooming, so that it is not desirable.

The condition (5) defines the lateral magnification of the second lens unit L2 at the wide-angle end. When the lateral magnification of the second lens unit L2 increases beyond the upper limit of the condition (5), the first lens unit L1 is located closer to the object side at the wide-angle end, so that it is necessary to increase the diameter of the front lens to realize a wide angle of view. Further, variation of curvature of field due to zooming increases, so that it is not desirable. When the lateral magnification of the second lens unit L2 decreases beyond the lower limit of the condition (5), the amount of movement of the second lens unit L2 during zooming increases and the total length of the lens increases, so that it is not desirable.

The condition (6) defines a ratio between the focal length f3 of the third lens unit L3 and the focal length fw of the entire zoom lens at the wide-angle end. When the absolute value |f3| of the focal length f3 of the third lens unit L3 increases beyond the upper limit of the condition (6), the variation of spherical aberration due to zooming increases, so that it is not desirable. When the absolute value |f3| of the focal length f3 of the third lens unit L3 decreases beyond the lower limit of the condition (6), it is difficult to appropriately correct axial chromatic aberration on the wide-angle side.

The condition (7) relates to refractive indices of negative lenses included in the first lens unit L1. When an average value of the refractive indices of the negative lenses of the first lens unit L1 decreases beyond the lower limit of the condition (7), the curvatures of the lenses included in the first lens unit L1 increase, so that it is difficult to appropriately correct curvature of field at the wide-angle end.

Ranges of numerical values in the conditions (3) to (7) can be set as follows:

$$2.05 < |fG11|/|f1| < 5.1 \quad (3a)$$

$$0.03 < M3/|f3| < 0.18 \quad (4a)$$

$$-0.28 < \beta 2w < -0.15 \quad (5a)$$

$$22.0 < |f3|/fw < 48.0 \quad (6a)$$

$$1.800 < N1d < 2.500 \quad (7a)$$

It is more desirable to set ranges of numerical values in the conditions (3) to (7) as follows:

$$2.1 < |fG11|/|f1| < 5.0 \quad (3b)$$

$$0.05 < M3/|f3| < 0.16 \quad (4b)$$

$$-0.25 < \beta 2w < -0.16 \quad (5b)$$

$$25.0 < |f3|/fw < 45.0 \quad (6b)$$

$$1.830 < N1d < 2.400 \quad (7b)$$

In each exemplary embodiment, the lens units are configured as described above, so that it is possible to obtain a zoom lens with a wide angle of view and a small size, which has good optical performance in the entire zoom area.

Next, the lens configuration of each exemplary embodiment will be described for each lens unit. The lenses are arranged in order from the object side to the image side unless otherwise stated.

The first lens unit L1 is configured as described below. In the first and fifth exemplary embodiments, the first lens unit L1 includes a negative lens having a meniscus shape whose surface facing the object side is convex, a negative lens whose both surfaces are concave surfaces, and a positive lens having a meniscus shape whose surface facing the object side is convex. In order to reduce the total length of the lens, the refractive power of the first lens unit L1 is increased. At this time, in the first lens unit L1, a lot of curvature of field occurs at the wide-angle end. Therefore, the negative refractive power is generated by two negative lenses, so that the aberration is prevented from occurring.

In the second, third, fourth, sixth, and seventh exemplary embodiments, the first lens unit L1 includes a negative lens having a meniscus shape whose surface facing the object side is convex, a negative lens whose surface facing the image side has a concave shape, a negative lens whose surface facing the image side has a concave shape, and a positive lens having a meniscus shape whose surface facing the object side is convex. The negative refractive power of the first lens unit L1 is generated by the three negative lenses, so that curvature of field at the wide-angle end is prevented from occurring.

In each exemplary embodiment, the second lens unit L2 includes a positive lens whose surface facing the object side is convex and a positive lens whose surface facing the object side is convex. In order to realize a large diameter, the diameter of the second lens unit L2 is large, so that a lot of spherical aberration occurs at the wide-angle end. Therefore, the positive refractive power of the second lens unit L2 is generated by the two positive lenses and further a surface of the second lens unit L2 closest to the object side is formed to be aspheric, so that generation of the spherical aberration is reduced.

In each exemplary embodiment, the third lens unit L3 includes a negative lens having a meniscus shape whose surface facing the object side is convex and a positive lens whose surface facing the image side is convex. In order to reduce the total length of the lens at the wide-angle end, the refractive power of the third lens unit L3 is increased, so that axial chromatic aberration is easily generated in the third lens unit L3. Therefore, the third lens unit L3 includes two lenses composed of a positive lens and a negative lens, so that the generation of the axial chromatic aberration is suppressed.

In each exemplary embodiment, the fourth lens unit L4 includes one lens having positive refractive power. In each exemplary embodiment, the fourth lens unit L4 is arranged near the image plane, so that the telecentricity on the image side is improved, and curvature of field and coma are corrected well.

Next, numerical examples 1 to 7 corresponding to the first to seventh exemplary embodiments of the present invention, respectively, will be described. In each numerical example, indicates a sequential number of an optical surface in order from the object side towards the image side. Here, ri indicates a radius of curvature of the i-th optical surface (the i-th surface), di indicates a distance between the i-th surface and the (i+1)th surface, and ndi and vdi indicate a refractive index and an Abbe number, respectively, of a material of the i-th optical member at the d line. Further, when k is an eccentricity, A5, A7, and A9 are aspheric coefficients, an x is a displacement in the optical axis direction at a position of height h from the optical axis based on a surface vertex, an aspheric shape is represented by the following formula:

$$x = (h^2/R)/[1+\{1-(1+k)(h/R)^2\}^{1/2}]+A5h^5+A7h^7+A9h^9$$

Here, R is a paraxial radius of curvature. Table 1 lists data in the conditions described above in each exemplary embodiment.

Numerical Example 1

| Unit: mm | | | | |
|---|---|---|---|---|
| Surface data | | | | |
| Surface number | r | d | nd | vd |
| 1 | 34.220 | 1.05 | 1.88300 | 40.8 |
| 2 | 11.602 | 7.26 | | |
| 3 | −194.256 | 0.75 | 1.80400 | 46.6 |
| 4 | 11.451 | 2.89 | | |

-continued

Unit: mm

| | | | | |
|---|---|---|---|---|
| 5 | 15.219 | 2.09 | 2.10205 | 16.8 |
| 6 | 23.855 | (variable) | | |
| 7(stop) | ∞ | (variable) | | |
| 8* | 15.430 | 1.80 | 1.72903 | 54.0 |
| 9* | 42.433 | 0.23 | | |
| 10 | 12.499 | 3.18 | 1.78800 | 47.4 |
| 11 | −62.547 | (variable) | | |
| 12 | 14.356 | 0.70 | 2.10205 | 16.8 |
| 13 | 7.168 | 1.27 | | |
| 14 | 37.943 | 1.54 | 1.66672 | 48.3 |
| 15 | −17.888 | (variable) | | |
| 16 | −105.464 | 0.83 | 1.51633 | 64.1 |
| 17 | −37.259 | 1.55 | | |
| 18 | ∞ | 2.24 | 1.51633 | 64.1 |
| 19 | ∞ | 3.66 | | |
| Image plane | ∞ | | | |

Aspheric surface data

Eighth surface

K = −4.86347e+000
A5 = −3.83751e−005 A7 = −8.23925e−007

Ninth surface

K = 0.00000e+000
A5 = −3.58950e−005 A7 = −7.62751e−007 A9 = 6.23432e−009

Various data
Zoom ratio 3.97

| | | | |
|---|---|---|---|
| Focal length | 2.42 | 3.28 | 9.60 |
| F-number | 1.24 | 1.36 | 2.34 |
| Angle of view | 78.64 | 54.23 | 17.85 |
| Total lens length | 70.24 | 59.71 | 46.52 |
| BF | 6.69 | 6.69 | 6.69 |
| d6 | 26.78 | 16.25 | 3.06 |
| d7 | 10.66 | 9.52 | 1.17 |
| d11 | 1.01 | 1.01 | 0.97 |
| d15 | 1.50 | 2.64 | 11.03 |

Zoom lens unit data

| Unit | Starting surface | Focal length |
|---|---|---|
| 1 | 1 | −9.58 |
| 2 | 8 | 9.97 |
| 3 | 12 | −79.13 |
| 4 | 16 | 111.12 |

Numerical Example 2

Unit: mm

Surface data

| Surface number | r | d | nd | vd |
|---|---|---|---|---|
| 1 | 41.014 | 1.05 | 1.88300 | 40.8 |
| 2 | 15.231 | 3.29 | | |
| 3 | 46.040 | 0.95 | 1.88300 | 40.8 |
| 4 | 10.976 | 4.31 | | |
| 5 | 98.784 | 0.75 | 1.83400 | 37.2 |
| 6 | 17.217 | 1.47 | | |
| 7 | 17.880 | 2.65 | 1.95906 | 17.5 |
| 8 | 54.904 | (variable) | | |
| 9(stop) | ∞ | (variable) | | |
| 10* | 18.858 | 2.01 | 1.75501 | 51.2 |
| 11* | 125.396 | 0.23 | | |
| 12 | 11.870 | 3.46 | 1.63854 | 55.4 |
| 13 | −44.791 | (variable) | | |
| 14 | 16.624 | 0.60 | 1.95906 | 17.5 |

-continued

Unit: mm

| | | | | |
|---|---|---|---|---|
| 15 | 7.181 | 1.55 | | |
| 16 | 24.543 | 1.71 | 1.57099 | 50.8 |
| 17 | −18.011 | (variable) | | |
| 18 | −33.795 | 0.74 | 1.54814 | 45.8 |
| 19 | −24.920 | 1.25 | | |
| 20 | ∞ | 2.24 | 1.51633 | 64.1 |
| 21 | ∞ | 3.66 | | |
| Image plane | ∞ | | | |

Aspheric surface data

Tenth surface

K = −9.27315e+000
A5 = −4.34075e−006 A7 = −8.72180e−007 A9 = 7.00209e−009

Eleventh surface

K = −6.88396e+002
A5 = −3.59278e−006 A7 = −6.86524e−007 A9 = 6.89071e−009

Various data
Zoom ratio 3.98

| | | | |
|---|---|---|---|
| Focal length | 2.41 | 3.33 | 9.60 |
| F-number | 1.24 | 1.38 | 2.33 |
| Angle of view | 80.00 | 53.34 | 17.86 |
| Total lens length | 75.24 | 62.98 | 48.07 |
| BF | 6.39 | 6.39 | 6.39 |
| d8 | 30.23 | 17.97 | 3.06 |
| d9 | 10.76 | 9.50 | 1.18 |
| d13 | 1.49 | 1.45 | 1.57 |
| d17 | 1.60 | 2.89 | 11.09 |

Zoom lens unit data

| Unit | Starting surface | Focal length |
|---|---|---|
| 1 | 1 | −9.69 |
| 2 | 10 | 10.40 |
| 3 | 14 | −86.40 |
| 4 | 18 | 168.16 |

Numerical Example 3

Unit: mm

Surface data

| Surface number | r | d | nd | vd |
|---|---|---|---|---|
| 1 | 26.937 | 1.05 | 1.88300 | 40.8 |
| 2 | 15.652 | 2.78 | | |
| 3 | 28.796 | 0.95 | 1.88300 | 40.8 |
| 4 | 10.322 | 5.71 | | |
| 5 | −92.802 | 0.75 | 1.83400 | 37.2 |
| 6 | 13.800 | 1.78 | | |
| 7 | 17.400 | 2.88 | 1.95906 | 17.5 |
| 8 | 65.595 | (variable) | | |
| 9(stop) | ∞ | (variable) | | |
| 10* | 18.429 | 2.00 | 1.75501 | 51.2 |
| 11* | 124.765 | 0.23 | | |
| 12 | 12.570 | 3.54 | 1.62041 | 60.3 |
| 13 | −31.579 | (variable) | | |
| 14 | 15.719 | 0.60 | 1.95906 | 17.5 |
| 15 | 7.079 | 1.55 | | |
| 16 | 20.305 | 1.79 | 1.53172 | 48.8 |
| 17 | −18.342 | (variable) | | |
| 18 | −23.997 | 0.69 | 1.83481 | 42.7 |
| 19 | −20.073 | 1.17 | | |

-continued

Unit: mm

| | | | | |
|---|---|---|---|---|
| 20 | ∞ | 2.24 | 1.51633 | 64.1 |
| 21 | ∞ | 3.66 | | |
| Image plane | ∞ | | | |

Aspheric surface data

Tenth surface

K = −9.72367e+000
A5 = −1.33721e−005 A7 = −9.33531e−007 A9 = 6.60260e−009

Eleventh surface

K = −8.08126e+002
A5 = −1.25998e−005 A7 = −6.93092e−007 A9 = 6.74575e−009

Various data
Zoom ratio 4.06

| | Wide angle | Middle | Telephoto |
|---|---|---|---|
| Focal length | 2.24 | 3.12 | 9.10 |
| F-number | 1.24 | 1.39 | 2.39 |
| Angle of view | 80.71 | 55.78 | 18.81 |
| Total lens length | 75.74 | 63.60 | 49.51 |
| BF | 6.31 | 6.31 | 6.31 |
| d8 | 29.29 | 17.15 | 3.06 |
| d9 | 10.86 | 9.60 | 1.19 |
| d13 | 1.48 | 1.46 | 1.67 |
| d17 | 1.48 | 2.77 | 10.97 |

Zoom lens unit data

| Unit | Starting surface | Focal length |
|---|---|---|
| 1 | 1 | −8.94 |
| 2 | 10 | 10.32 |
| 3 | 14 | −98.54 |
| 4 | 18 | 136.18 |

Numerical Example 4

Unit: mm

Surface data

| Surface number | r | d | nd | νd |
|---|---|---|---|---|
| 1 | 34.312 | 1.05 | 1.88300 | 40.8 |
| 2 | 18.318 | 3.99 | | |
| 3 | 58.741 | 0.95 | 1.88300 | 40.8 |
| 4 | 11.944 | 4.18 | | |
| 5 | 47.913 | 0.75 | 1.83481 | 42.7 |
| 6 | 14.314 | 1.52 | | |
| 7 | 15.894 | 2.53 | 1.95906 | 17.5 |
| 8 | 33.643 | (variable) | | |
| 9(stop) | ∞ | (variable) | | |
| 10* | 17.473 | 2.03 | 1.75501 | 51.2 |
| 11* | 106.769 | 0.23 | | |
| 12 | 12.674 | 3.32 | 1.67790 | 55.3 |
| 13 | −43.334 | (variable) | | |
| 14 | 18.385 | 0.60 | 1.95906 | 17.5 |
| 15 | 7.080 | 1.55 | | |
| 16 | 23.495 | 1.48 | 1.76200 | 40.1 |
| 17 | −28.853 | (variable) | | |
| 18 | −37.926 | 0.68 | 1.77347 | 28.9 |
| 19 | −29.531 | 1.23 | | |
| 20 | ∞ | 2.24 | 1.51633 | 64.1 |
| 21 | ∞ | 3.66 | | |
| Image plane | ∞ | | | |

-continued

Unit: mm

Aspheric surface data

Tenth surface

K = −1.18190e+001
A5 = −2.04456e−005 A7 = −1.09308e−006 A9 = 7.69985e−010

Eleventh surface

K = −1.62044e+003
A5 = −3.17622e−005 A7 = −7.26374e−007 A9 = 3.98578e−009

Various data
Zoom ratio 4.42

| | | | |
|---|---|---|---|
| Focal length | 2.42 | 3.43 | 10.70 |
| F-number | 1.24 | 1.39 | 2.33 |
| Angle of view | 79.96 | 51.64 | 16.00 |
| Total lens length | 79.82 | 65.38 | 48.19 |
| BF | 6.37 | 6.37 | 6.37 |
| d8 | 34.69 | 20.24 | 3.06 |
| d9 | 10.92 | 9.68 | 1.18 |
| d13 | 1.50 | 1.44 | 1.74 |
| d17 | 1.50 | 2.79 | 10.99 |

Zoom lens unit data

| Unit | Starting surface | Focal length |
|---|---|---|
| 1 | 1 | −10.71 |
| 2 | 10 | 10.11 |
| 3 | 14 | −67.51 |
| 4 | 18 | 166.60 |

Numerical Example 5

Unit: mm

Surface data

| Surface number | r | d | nd | νd |
|---|---|---|---|---|
| 1 | 33.587 | 1.05 | 1.88300 | 40.8 |
| 2 | 11.680 | 7.15 | | |
| 3 | −208.171 | 0.75 | 1.81600 | 46.6 |
| 4 | 11.507 | 3.05 | | |
| 5 | 14.924 | 2.13 | 2.10205 | 16.8 |
| 6 | 23.246 | (variable) | | |
| 7(stop) | ∞ | (variable) | | |
| 8* | 19.056 | 1.70 | 1.72903 | 54.0 |
| 9* | 48.713 | 0.23 | | |
| 10 | 12.724 | 2.93 | 1.83481 | 42.7 |
| 11 | −141.755 | (variable) | | |
| 12 | 15.966 | 0.70 | 2.10205 | 16.8 |
| 13 | 7.916 | 1.43 | | |
| 14 | 41.686 | 1.54 | 1.65160 | 58.5 |
| 15 | −17.827 | (variable) | | |
| 16 | 62.660 | 0.93 | 1.75500 | 52.3 |
| 17 | −94.620 | (variable) | | |
| 18 | ∞ | 2.24 | 1.51633 | 64.1 |
| 19 | ∞ | 3.45 | | |
| Image plane | ∞ | | | |

Aspheric surface data

Eighth surface

K = −7.20745e+000
A5 = −4.70154e−005 A7 = −3.89672e−007

-continued

Unit: mm

Ninth surface

K = 0.00000e+000
A5 = −4.48156e−005 A7 = −2.52365e−007 A9 = 2.98682e−009

Various data
Zoom ratio 3.98

| | | | |
|---|---|---|---|
| Focal length | 2.41 | 3.27 | 9.60 |
| F-number | 1.24 | 1.35 | 2.44 |
| Angle of view | 78.67 | 54.36 | 17.88 |
| Total lens length | 73.24 | 62.48 | 50.05 |
| BF | 6.16 | 6.16 | 6.18 |
| d6 | 27.02 | 16.26 | 3.83 |
| d7 | 12.27 | 10.94 | 1.21 |
| d11 | 1.22 | 1.19 | 1.00 |
| d15 | 2.98 | 4.33 | 14.24 |
| d17 | 1.22 | 1.22 | 1.24 |

Zoom lens unit data

| Unit | Starting surface | Focal length |
|---|---|---|
| 1 | 1 | −9.78 |
| 2 | 8 | 10.93 |
| 3 | 12 | −107.30 |
| 4 | 16 | 50.06 |

Numerical Example 6

Unit: mm

Surface data

| Surface number | r | d | nd | vd |
|---|---|---|---|---|
| 1 | 29.906 | 1.05 | 1.88300 | 40.8 |
| 2 | 12.484 | 6.71 | | |
| 3 | −123.365 | 0.95 | 1.88300 | 40.8 |
| 4 | 12.647 | 2.71 | | |
| 5 | 38.148 | 0.75 | 1.83481 | 42.7 |
| 6 | 17.091 | 0.87 | | |
| 7 | 17.596 | 2.75 | 1.95906 | 17.5 |
| 8 | 58.047 | (variable) | | |
| 9(stop) | ∞ | (variable) | | |
| 10* | 17.850 | 2.06 | 1.75501 | 51.2 |
| 11* | 110.345 | 0.23 | | |
| 12 | 12.368 | 3.93 | 1.62041 | 60.3 |
| 13 | −33.898 | (variable) | | |
| 14 | 15.259 | 0.60 | 1.95906 | 17.5 |
| 15 | 6.700 | 1.55 | | |
| 16 | 13.445 | 1.91 | 1.54814 | 45.8 |
| 17 | −27.509 | (variable) | | |
| 18 | −14.227 | 0.65 | 1.84666 | 23.9 |
| 19 | −13.556 | 1.23 | | |
| 20 | ∞ | 2.24 | 1.51633 | 64.1 |
| 21 | ∞ | 3.66 | | |
| Image plane | ∞ | | | |

Aspheric surface data

Tenth surface

K = −9.32495e+000
A5 = −5.41955e−006 A7 = −1.08957e−006 A9 = 8.95206e−009

Eleventh surface

K = −8.50367e+002
A5 = −1.00726e−005 A7 = −7.76262e−007 A9 = 8.00511e−009

-continued

Unit: mm

Various data
Zoom ratio 4.00

| | | | |
|---|---|---|---|
| Focal length | 2.40 | 3.31 | 9.59 |
| F-number | 1.24 | 1.39 | 2.37 |
| Angle of view | 80.07 | 53.48 | 17.89 |
| Total lens length | 73.26 | 62.41 | 50.31 |
| BF | 6.37 | 6.37 | 6.37 |
| d8 | 26.01 | 15.16 | 3.06 |
| d9 | 11.18 | 9.87 | 1.14 |
| d13 | 1.49 | 1.51 | 2.03 |
| d17 | 1.50 | 2.79 | 10.99 |

Zoom lens unit data

| Unit | Starting surface | Focal length |
|---|---|---|
| 1 | 1 | −8.60 |
| 2 | 10 | 10.35 |
| 3 | 14 | −100.98 |
| 4 | 18 | 234.98 |

Numerical Example 7

Unit: mm

Surface data

| Surface number | r | d | nd | vd |
|---|---|---|---|---|
| 1 | 34.312 | 1.05 | 1.88300 | 40.8 |
| 2 | 18.318 | 4.88 | | |
| 3 | 57.452 | 0.95 | 1.88300 | 40.8 |
| 4 | 12.565 | 4.75 | | |
| 5 | 53.723 | 0.75 | 1.83481 | 42.7 |
| 6 | 15.586 | 1.69 | | |
| 7 | 17.188 | 2.71 | 1.95906 | 17.5 |
| 8 | 36.904 | (variable) | | |
| 9(stop) | ∞ | (variable) | | |
| 10* | 17.671 | 1.95 | 1.75501 | 51.2 |
| 11* | 91.869 | 0.23 | | |
| 12 | 12.750 | 3.30 | 1.67790 | 55.3 |
| 13 | −43.497 | (variable) | | |
| 14 | 17.819 | 0.60 | 1.95906 | 17.5 |
| 15 | 7.154 | 1.55 | | |
| 16 | 27.292 | 1.43 | 1.76200 | 40.1 |
| 17 | −27.302 | (variable) | | |
| 18 | 743.022 | 0.70 | 1.83481 | 42.7 |
| 19 | −130.843 | 1.23 | | |
| 20 | ∞ | 2.24 | 1.51633 | 64.1 |
| 21 | ∞ | 3.66 | | |
| Image plane | ∞ | | | |

Aspheric surface data

Tenth surface

K = −1.35685e+001
A5 = −2.44519e−005 A7 = −1.17810e−006 A9 = −6.33616e−010

Eleventh surface

K = −1.24356e+003
A5 = −3.72998e−005 A7 = −7.74988e−007 A9 = 3.77587e−009

Various data
Zoom ratio 4.49

| | | | |
|---|---|---|---|
| Focal length | 2.33 | 3.31 | 10.49 |
| F-number | 1.24 | 1.39 | 2.38 |
| Angle of view | 81.15 | 53.02 | 16.71 |
| Total lens length | 84.74 | 68.94 | 49.25 |
| BF | 6.36 | 6.36 | 6.36 |

-continued

Unit: mm

| d8 | 37.94 | 22.14 | 2.46 |
|---|---|---|---|
| d9 | 10.91 | 9.70 | 1.31 |
| d13 | 1.49 | 1.41 | 1.60 |
| d17 | 1.49 | 2.78 | 10.98 |

Zoom lens unit data

| Unit | Starting surface | Focal length |
|---|---|---|
| 1 | 1 | −11.22 |
| 2 | 10 | 10.28 |
| 3 | 14 | −65.41 |
| 4 | 18 | 133.32 |

TABLE 1

| | Numerical Examples | | | | | | |
|---|---|---|---|---|---|---|---|
| | 1 | 2 | 3 | 4 | 5 | 6 | 7 |
| f4/fw | 45.9 | 69.7 | 60.8 | 68.9 | 20.8 | 98.1 | 57.1 |
| \|f1\|/fw | 4.0 | 4.0 | 4.0 | 4.4 | 4.1 | 3.6 | 4.8 |
| \|fG11\|/\|f1\| | 2.12 | 2.89 | 4.95 | 4.29 | 2.12 | 2.90 | 4.09 |
| M3/\|f3\| | 0.12 | 0.11 | 0.10 | 0.14 | 0.10 | 0.09 | 0.14 |
| β2w | −0.22 | −0.21 | −0.21 | −0.23 | −0.23 | −0.23 | −0.17 |
| \|f3\|/fw | 32.7 | 35.8 | 44.0 | 44.5 | 44.5 | 42.2 | 28.0 |
| N1d | 1.843 | 1.867 | 1.867 | 1.849 | 1.849 | 1.867 | 1.867 |

While the exemplary embodiments and numerical examples of the present invention have been described with specific values, the present invention is not limited to the values provided in the exemplary embodiments and numerical examples, unless expressly stated herein. Otherwise, those having ordinary skill in the art will realize that various changes and modifications can be made without departing from the scope of the invention. It is also possible to output an image with less distortion by electrically correcting distortion by a signal processing circuit.

In particular, distortion on the wide-angle side can be corrected. It is possible to reduce the effective diameter of the front lens by setting the diameter of an effective image circle on the wide-angle side to be smaller than the diameter of an effective image circle on the telephoto side.

Next, an exemplary embodiment of a monitoring camera (image pickup apparatus) using the zoom lens according to at least one of the exemplary embodiments of the present invention as a photographic optical system will be described with reference to FIG. 15. FIG. 15 illustrates a monitoring camera main body 30 and a photographic optical system 31 including any one of the zoom lenses described in the first to seventh exemplary embodiments. A solid-state image sensor 32 such as a CCD sensor or a CMOS sensor receives light of an object image formed by the photographic optical system 31. A memory 33 stores the object image and information corresponding to the object image photoelectrically converted by the solid-state image sensor 32. A network cable 34 provides electrical power to the monitoring camera and transmits the object image photoelectrically converted by the solid-state image sensor 32, which has captured the object image.

While the present invention has been described with reference to exemplary embodiments, it is to be understood that the invention is not limited to the disclosed exemplary embodiments. The scope of the following claims is to be accorded the broadest interpretation so as to encompass such all modifications and equivalent structures and functions.

This application claims the benefit of Japanese Patent Application No. 2012-158513 filed Jul. 17, 2012, which is hereby incorporated by reference herein in its entirety.

What is claimed is:

1. A zoom lens comprising, in order from an object side to an image side:
    a first lens unit having negative refractive power;
    a second lens unit having positive refractive power;
    a third lens unit having negative refractive power; and
    a fourth lens unit having positive refractive power,
    wherein, during zooming, a distance between every adjacent lens unit from the first to fourth lens units varies, and
    when a focal length of the entire zoom lens at a wide-angle end is denoted by fw, a focal length of the first lens unit is denoted by f1, and a focal length of the fourth lens unit is denoted by f4, the following conditions are satisfied:

$$12.4 < f4/fw < 200.0$$

$$2.9 < |f1|/fw < 6.0.$$

2. The zoom lens according to claim 1, wherein, when a focal length of a lens G11 located closest to the object side in the first lens unit is denoted by fG11, the following condition is satisfied:

$$2.0 < |fG11|/|f1| < 5.2.$$

3. The zoom lens according to claim 1, wherein, when a focal length of the third lens unit is denoted by f3 and an amount of movement of the third lens unit during zooming from the wide-angle end to a telephoto end is denoted by M3, the following condition is satisfied:

$$0.01 < M3/|f3| < 0.20.$$

4. The zoom lens according to claim 1, wherein, when a lateral magnification of the second lens unit at the wide-angle end is denoted by β2w, the following condition is satisfied:

$$-0.30 < \beta 2w < -0.15.$$

5. The zoom lens according to claim 1, wherein, when a focal length of the third lens unit is denoted by f3, the following condition is satisfied:

$$20.0 < |f3|/fw < 50.0.$$

6. The zoom lens according to claim 1, wherein, when an average value of refractive indices of all negative lenses included in the first lens unit is denoted by N1d, the following condition is satisfied:

$$1.800 < N1d.$$

7. The zoom lens according to claim 1, wherein during focusing from an infinitely distant object to a near-distant object, the third lens unit moves toward the image side.

8. The zoom lens according to claim 1, wherein the fourth lens unit includes a single lens having positive refractive power.

9. The zoom lens according to claim 1, wherein during zooming from the wide-angle end to a telephoto end, the fourth lens unit does not move.

10. An image pickup apparatus comprising:
  a zoom lens; and
  an image sensor configured to receive an image formed by the zoom lens,
  wherein the zoom lens comprises, in order from an object side to an image side:
    a first lens unit having negative refractive power;
    a second lens unit having positive refractive power;
    a third lens unit having negative refractive power; and
    a fourth lens unit having positive refractive power,
  wherein, during zooming, a distance between every adjacent lens unit from the first to fourth lens units varies, and
  when a focal length of the entire zoom lens at a wide-angle end is denoted by fw, a focal length of the first lens unit is denoted by f1, and a focal length of the fourth lens unit is denoted by f4, the following conditions are satisfied:

$$12.4 < f4/fw < 200.0$$

$$2.9 < |f1|/fw < 6.0.$$

* * * * *